US012798916B2

(12) United States Patent
Maida

(10) Patent No.: US 12,798,916 B2
(45) Date of Patent: Nov. 17, 2026

(54) AIR BAR, DRYING DEVICE, AND INK JET PRINTING APPARATUS

(71) Applicant: FUJIFILM Corporation, Tokyo (JP)

(72) Inventor: Noriaki Maida, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 228 days.

(21) Appl. No.: 18/433,414

(22) Filed: Feb. 6, 2024

(65) Prior Publication Data

US 2024/0174473 A1 May 30, 2024

Related U.S. Application Data

(63) Continuation of application No. PCT/JP2022/023583, filed on Jun. 13, 2022.

(30) Foreign Application Priority Data

Aug. 16, 2021 (JP) ................................ 2021-132134

(51) Int. Cl.
*B65H 23/24* (2006.01)
*B41J 11/00* (2006.01)
(Continued)

(52) U.S. Cl.
CPC ............ *B65H 23/24* (2013.01); *B41J 11/002* (2013.01); *B65H 20/10* (2013.01); *B65H 20/14* (2013.01);
(Continued)

(58) Field of Classification Search
CPC ........ B65H 20/02; B65H 20/04; B65H 20/10; B65H 20/12; B65H 20/14; B65H 27/00;
(Continued)

(56) References Cited

U.S. PATENT DOCUMENTS 2,368,341 A * 1/1945 Zuckerman ............ B65H 23/24 34/115
3,567,093 A * 3/1971 Johnson ................. B65H 23/24 242/615.12
(Continued)

FOREIGN PATENT DOCUMENTS

CA 2798032 12/2011
CN 111578656 A * 8/2020 ............ F26B 21/001
(Continued)

OTHER PUBLICATIONS

DE102008008772B4 Translation; Bach et al; Guide Element For Conducting Flexible Flat Material; Published On: Dec. 9, 2010; Published By: Espacent (Year: 2010).*
(Continued)

*Primary Examiner* — Victoria P Augustine
*Assistant Examiner* — Raveen J Dias
(74) *Attorney, Agent, or Firm* — JCIPRNET

(57) ABSTRACT

An air bar includes: a tubular body part consisting of a porous body having a plurality of holes penetrating an outer peripheral surface and an inner peripheral surface; an air supply mechanism part for supplying air to an inside of the body part; and cover parts that prevent outflow of the air from both side ends of the body part, in which the outer peripheral surface of the body part includes a non-jetting region in which the holes are closed and a jetting region other than the non-jetting region, the jetting region is disposed at a position corresponding to a guide surface for guiding a web-shaped workpiece of the air bar in a noncontact manner, and the non-jetting region is disposed at a position corresponding to an outer surface of the air bar other than the guide surface.

12 Claims, 12 Drawing Sheets

(51) Int. Cl.
*B65H 20/10* (2006.01)
*B65H 20/14* (2006.01)
*B65H 27/00* (2006.01)
*F26B 13/14* (2006.01)
*F26B 13/16* (2006.01)

(52) U.S. Cl.
CPC ............. *B65H 27/00* (2013.01); *F26B 13/14* (2013.01); *F26B 13/16* (2013.01); *B65H 2301/4461* (2013.01); *B65H 2404/1363* (2013.01); *B65H 2406/113* (2013.01); *B65H 2406/1131* (2013.01); *B65H 2406/1132* (2013.01); *B65H 2406/12* (2013.01); *B65H 2406/121* (2013.01); *B65H 2801/03* (2013.01); *B65H 2801/21* (2013.01)

(58) Field of Classification Search
CPC ...... B65H 23/24; B65H 23/245; B65H 23/26; B65H 2301/4461; B65H 2404/1361; B65H 2404/1363; B65H 2404/1364; B65H 2406/11; B65H 2406/111; B65H 2406/1115; B65H 2406/113; B65H 2406/1131; B65H 2406/1132; B65H 2406/12; B65H 2406/121; B65H 2406/1211; B65H 2406/122; B65H 2406/13; B65H 2406/131; B65H 2406/14; B65H 2406/15; B65H 2406/365; B65H 2801/03; B65H 2801/06; B65H 2801/09; B65H 2801/12; B65H 2801/15; B65H 2801/18; B65H 2801/21; B65H 23/025; B65H 23/038; B65H 23/048; B65H 23/10; B65H 23/188; B65H 23/195; B65H 29/245; B65H 29/247; B41J 11/0015; B41J 11/002; B41J 11/0022; B41J 11/00224; B41J 11/0045; B41J 11/04; B41J 11/0057; B41J 15/04; B41J 15/046; B41J 13/02; B41J 13/03; B41J 13/036; B41J 13/076; F26B 13/14; F26B 13/145; F26B 13/16; F26B 13/18; F26B 13/22; F26B 13/24; F16C 13/003; F16C 13/006
USPC ............ 242/615.11, 615.12, 615.4; 101/420; 226/97.3
See application file for complete search history.

(56) References Cited

U.S. PATENT DOCUMENTS 3,701,135 A * 10/1972 Price ........................ G11B 5/53 242/615.12
4,200,211 A * 4/1980 Yamagishi ............. B65H 23/24 242/615.1
4,466,605 A * 8/1984 Leuthold .............. B65H 29/243 271/195
4,552,069 A * 11/1985 Jahn ........................ B41F 22/00 29/445
5,084,985 A * 2/1992 Ventola .................. B65H 20/12 34/115
5,293,699 A * 3/1994 Faust .................... F26B 21/004 242/615.11
5,423,468 A * 6/1995 Liedtke .................. B65H 23/24 242/615.12
5,464,143 A * 11/1995 Hansen .................. B65H 23/24 242/615.12
5,913,268 A * 6/1999 Jackson ............... B65H 15/004 101/232
5,915,648 A * 6/1999 Madrzak ................... D21F 1/36 162/368
6,004,432 A * 12/1999 Page ...................... B65H 23/32 162/271
6,302,353 B1 * 10/2001 Motegi .................. B65H 23/32 242/615.12
6,382,100 B1 * 5/2002 Satoh ..................... B65H 23/24 242/615
6,427,941 B1 8/2002 Hikita
6,533,217 B2 * 3/2003 Lind ......................... D21F 1/40 226/97.1
6,796,524 B2 * 9/2004 Pollock .................. B65H 23/32 226/174
9,157,186 B2 * 10/2015 Jo .......................... A24D 1/025
9,902,564 B1 * 2/2018 Huang ................... B65H 20/12
9,950,889 B2 * 4/2018 Higeta ................... B65H 20/24
11,046,055 B1 * 6/2021 Yang ..................... F16C 13/006
11,267,272 B2 3/2022 Toyama et al.
2005/0017123 A1 * 1/2005 Meyer .................... B65H 23/26 242/615.12
2005/0098680 A1 * 5/2005 Naruoka ................ B65H 29/52 242/615.12
2006/0278360 A1 * 12/2006 Solberg .................. B65H 23/24 162/272
2006/0288601 A1 * 12/2006 Mayer .................... B65H 23/32 34/71
2007/0012205 A1 * 1/2007 Chevalier ............. B41F 35/007 101/226
2007/0228607 A1 * 10/2007 Narukawa ................ B29D 7/01 264/316
2008/0010852 A1 * 1/2008 Oechsle ................. B65H 23/32 242/615.12
2008/0218905 A1 * 9/2008 Biskeborn .............. G11B 15/43
2009/0297245 A1 * 12/2009 Godden .............. B41F 23/0403 101/487
2010/0064917 A1 * 3/2010 Blanchard ............... B41F 22/00 101/483
2010/0118096 A1 * 5/2010 Mouri .................... B41J 2/0057 347/102
2011/0135405 A1 * 6/2011 Miyaji ................... H10K 71/00 406/70
2013/0108790 A1 * 5/2013 Dehn ....................... B41J 11/04 427/256
2013/0119182 A1 5/2013 Higeta
2013/0152807 A1 * 6/2013 Armbruster ............ B65H 23/24 101/232
2014/0151493 A1 * 6/2014 Slyne .................... B29C 70/388 242/615.1
2015/0239700 A1 8/2015 Cornell et al.
2017/0028706 A1 * 2/2017 Hill ........................ B65H 16/06
2017/0029951 A1 * 2/2017 Bettin ..................... B05C 3/125
2017/0157917 A1 * 6/2017 Young ..................... B05C 3/125
2017/0259466 A1 * 9/2017 Domeniconi ............. D21F 3/10
2018/0264803 A1 * 9/2018 Hoshino .................. B41J 15/08
2019/0047298 A1 2/2019 Hashimoto et al.
2019/0091993 A1 * 3/2019 Uesaka ................ B41J 11/0024
2019/0293349 A1 * 9/2019 Boje ..................... F26B 13/108
2020/0122492 A1 * 4/2020 Campbell ............ B41J 11/0085
2020/0384781 A1 * 12/2020 Toyama ................. B41J 29/377
2021/0016578 A1 * 1/2021 Nishimura ................ F26B 3/30
2021/0230742 A1 * 7/2021 Okami .................. C23C 14/205
2025/0223129 A1 * 7/2025 Nishikawa ........... B65H 23/038

FOREIGN PATENT DOCUMENTS

DE 10137725 2/2003
DE 102008008772 9/2009
JP H05208764 8/1993
JP H07318249 A * 12/1995 ............. B65H 23/24
JP H08119508 5/1996
JP 2000255818 9/2000
JP 2007302439 11/2007
JP 2011196535 10/2011
JP 2011251803 12/2011
JP 2013103806 5/2013
JP 2013195943 9/2013
JP 2017036146 2/2017
JP 2019031019 2/2019
JP 2020199654 12/2020

(56) References Cited

FOREIGN PATENT DOCUMENTS

| | | | | | |
|---|---|---|---|---|---|
| JP | 2021046309 | | | 3/2021 | |
| KR | 101007844 | B1 | * | 1/2011 | ................ F26B 3/02 |
| KR | 20150040122 | A | * | 4/2015 | ............. B65H 27/00 |
| KR | 20160073024 | A | * | 6/2016 | ............. B65H 20/10 |
| KR | 102095447 | B1 | * | 3/2020 | ............. B65H 20/14 |
| WO | WO-03013995 | A1 | * | 2/2003 | ............. B65H 23/32 |
| WO | WO-2006040073 | A1 | * | 4/2006 | ............. B65H 23/32 |
| WO | WO-2011152430 | A1 | * | 12/2011 | ............. B65H 23/32 |
| WO | WO-2016072786 | A1 | * | 5/2016 | ............. B65H 27/00 |
| WO | WO-2021199871 | A1 | * | 10/2021 | .......... B41J 11/0022 |

OTHER PUBLICATIONS

JP2000255818A Translation; Okiyama et al; Belt Conveyance Mechanism; Published On: Sep. 19, 2000; Published By: Espacent (Year: 2000).*

JP2011196535A Translation; Adachi et al; Porous Plastic Roll, Method Of Manufacturing The Same, And Film Conveying Device Using Porous Plastic Roll; Published On: Oct. 6, 2011; Published By: Espacent (Year: 2011).*

JP201736146A Translation; Uchiumi C; Web Guide Device; Published On: Feb. 16, 2017; Published By: Espacent (Year: 2017).*

"Search Report of Europe Counterpart Application", issued on Nov. 18, 2024, pp. 1-11.

"International Search Report (Form PCT/ISA/210) of PCT/JP2022/023583", mailed on Jul. 19, 2022, with English translation thereof, pp. 1-6.

"Written Opinion of the International Searching Authority (Form PCT/ISA/237) of PCT/JP2022/023583", mailed on Jul. 19, 2022, with English translation thereof, pp. 1-8.

"Notice of Reasons for Refusal of Japan Counterpart Application", issued on Oct. 1, 2025, with English translation thereof, p. 1-p. 8.

* cited by examiner

AIR BAR, DRYING DEVICE, AND INK JET PRINTING APPARATUS

CROSS-REFERENCE TO RELATED APPLICATIONS

The present application is a Continuation of PCT International Application No. PCT/JP2022/023583 filed on Jun. 13, 2022 claiming priority under 35 U.S.C § 119(a) to Japanese Patent Application No. 2021-132134 filed on Aug. 16, 2021. Each of the above applications is hereby expressly incorporated by reference, in its entirety, into the present application.

BACKGROUND OF THE INVENTION

1. Field of the Invention

The present invention relates to an air bar, a drying device, and an ink jet printing apparatus, and particularly relates to a technique of guiding a web-shaped substrate in a noncontact manner.

2. Description of the Related Art

A transport device that transports a web-shaped substrate is known. In a case in which this transport device transports a substrate to which an ink has been applied for printing, it is required to guide the substrate without contacting an ink-applied surface of the substrate until the applied ink is dried.

JP2011-251803A discloses a direction changing device that changes a running direction of a running long sheet while keeping the long sheet in a floating state. This direction changing device has a configuration in which a porous sheet is wound around a columnar pipe having holes.

SUMMARY OF THE INVENTION

However, in the direction changing device disclosed in JP2011-251803A, it is difficult to bring the pipe and the porous layer into close contact with each other, and pressure escapes through a gap therebetween, whereby air flows out even from a surface that is not used for flotation. As a result, there is a problem that not only an amount of air consumption increases but also pressure of air, which is energy for flotation of the long sheet, escapes, resulting in a reduction in a floating height.

The present invention has been made in view of such circumstances, and an object of the present invention is to provide an air bar, a drying device, and an ink jet printing apparatus that suppress an amount of air consumption and increase a floating height.

In order to achieve the above object, according to one aspect, there is provided an air bar that guides a web-shaped workpiece on a guide surface of an outer surface in a noncontact manner, the air bar comprising: a body part that has a tubular shape having a first outer peripheral surface and a first inner peripheral surface and consists of a porous body having a plurality of first holes penetrating the first outer peripheral surface and the first inner peripheral surface; an air supply mechanism part for supplying air to an inside of the body part; and cover parts that are provided at both side ends of the body part to prevent outflow of the air from the both side ends, in which the first outer peripheral surface of the body part includes a first non-jetting region in which the first holes are closed and a first jetting region other than the first non-jetting region, the first jetting region is disposed at a position corresponding to the guide surface of the air bar, and the first non-jetting region is disposed at a position corresponding to the outer surface of the air bar other than the guide surface. According to this aspect, the air is jetted only from the first jetting region of the body part disposed at the position corresponding to the guide surface of the air bar, and the air is not jetted from the first non-jetting region of the body part disposed at the position corresponding to the outer surface other than the guide surface, so that it is possible to suppress the amount of air consumption and increase the floating height.

It is preferable that the first jetting region of the body part constitutes the guide surface of the air bar, and the first non-jetting region of the body part constitutes the outer surface of the air bar other than the guide surface. The air is jetted only from the first jetting region of the body part constituting the guide surface of the air bar, and the air is not jetted from the first non-jetting region of the body part constituting the outer surface other than the guide surface, so that it is possible to suppress the amount of air consumption and increase the floating height.

It is preferable that the air bar further comprises a perforated container that has a tubular shape having a second outer peripheral surface and a second inner peripheral surface and has a plurality of second holes penetrating the second outer peripheral surface and the second inner peripheral surface, the perforated container is disposed inside the body part, and the air supply mechanism part supplies air to an inside of the perforated container. Thereby, it is possible to suppress deformation of the outer surface in a case in which force is applied to the outer surface during transport of the workpiece and during maintenance of the air bar.

It is preferable that the perforated container includes a second jetting region in which the second holes are provided and a second non-jetting region other than the second jetting region, the second jetting region is disposed at a position corresponding to the guide surface of the air bar, and the second non-jetting region is disposed at a position corresponding to the outer surface of the air bar other than the guide surface. The air is jetted only from the second jetting region of the perforated container disposed at the position corresponding to the guide surface of the air bar, and the air is not jetted from the second non-jetting region of the perforated container disposed at the position corresponding to the outer surface other than the guide surface, so that it is possible to suppress the amount of air consumption and increase the floating height.

It is preferable that the first non-jetting region is formed by surface coating. With the surface coating, the first non-jetting region can be appropriately configured.

It is preferable that the first jetting region and the first non-jetting region are formed in different colors. Thereby, it is possible to improve workability in a case in which the air bar is assembled to a device and the air bar is adjusted.

It is preferable that the air supply mechanism part is provided in the cover part or the first non-jetting region of the body part. Thereby, it is possible to appropriately supply the air to the inside of the body part.

It is preferable that a static elimination brush that abuts on the air bar or an ionizer that supplies ions to the guide surface is provided. With the static elimination brush or the ionizer, it is possible to eliminate static electricity from the air bar and suppress the adverse effect of the charging of the air bar on the guide of the substrate.

A charging device that charges the workpiece to have the same polarity as a polarity with which the air bar is charged by the air may be provided. With the charging device, it is possible to transport the workpiece in a noncontact manner by using electrostatic repulsion.

It is preferable that the porous body is made of a resin. In addition, it is preferable that the porous body contains any one of polyethylene (PE), polypropylene (PP), or polytetrafluoroethylene (PTFE). Thereby, the body part can be appropriately configured.

In order to achieve the above object, according to another aspect, there is provided a drying device comprising: the air bar which guides the web-shaped workpiece to which a liquid is applied in a noncontact manner; and a heating device that heats the workpiece. According to this aspect, it is possible to suppress the amount of air consumption and increase the floating height in a case in which the web-shaped workpiece to which the liquid is applied is dried in a noncontact manner.

In order to achieve the above object, according to still another aspect, there is provided an ink jet printing apparatus comprising: an ink jet head that applies an ink to a web-shaped workpiece to record an image; and the drying device. According to this aspect, it is possible to suppress the amount of air consumption and increase the floating height in a case in which the ink is applied to the web-shaped workpiece to record an image and is dried in a noncontact manner.

According to the present invention, it is possible to suppress the amount of air consumption and increase the floating height.

DESCRIPTION OF THE PREFERRED EMBODIMENTS

Hereinafter, preferred embodiments of the present invention will be described with reference to the accompanying drawings.

<Drying Device>

Figure 1:
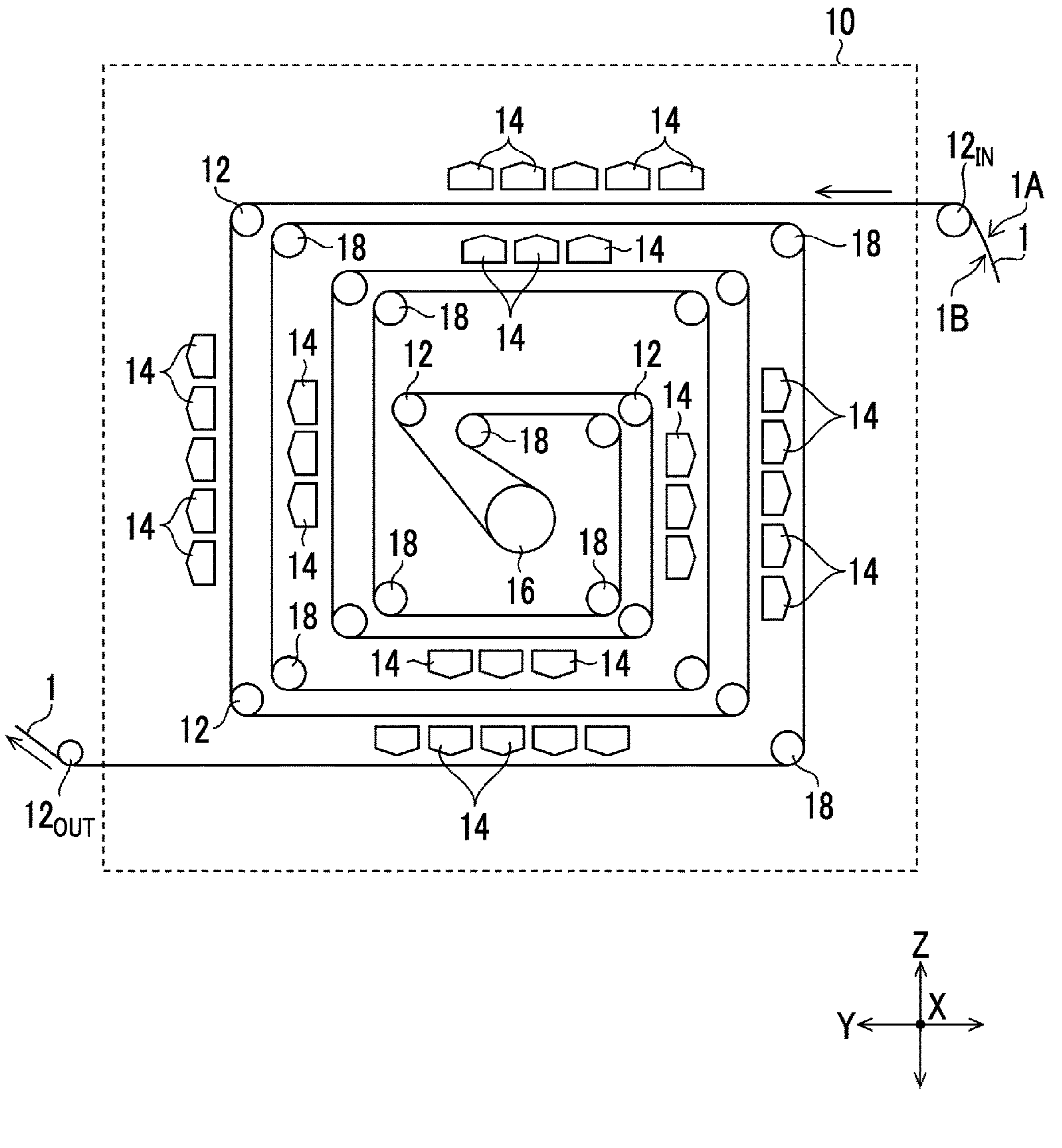
FIG. 1 is a side view showing a configuration of a drying device.

FIG. 1 is a side view showing a configuration of a drying device 10. The drying device 10 is a device that dries a web-shaped substrate 1 (an example of a workpiece) having a liquid application surface 1A to which a liquid is applied while transporting the substrate 1 along a transport path. As shown in FIG. 1, the drying device 10 comprises a plurality of pass rollers 12, a plurality of hot air heaters 14, a folding-back roller 16, and a plurality of air rolls 18.

The pass roller 12 comes into contact with an opposite surface 1B, which is a back surface of the liquid application surface 1A of the substrate 1, and functions as a guide roller that rotates as the substrate 1 is transported to guide the substrate 1. The substrate 1 guided from a pass roller $\mathbf{12}_{IN}$ on an inlet side (an upstream side of the transport path of the substrate 1) of the drying device 10 is transported to an inside of the drying device 10. In the drying device 10, the substrate 1 guided from the pass roller $\mathbf{12}_{IN}$ is guided toward a central portion of the drying device 10 by the plurality of pass rollers 12 and is transported to the folding-back roller 16.

The plurality of hot air heaters 14 are disposed on the transport path from an inlet of the drying device 10 to the folding-back roller 16. Each of the hot air heaters 14 is disposed such that an air blowing surface faces the liquid application surface 1A of the substrate 1. Each of the hot air heaters 14 functions as a heating device that blows hot air toward the liquid application surface 1A of the substrate 1 to heat the substrate 1 and dries the liquid applied to the liquid application surface 1A.

The folding-back roller 16 is rotated by a motor (not shown) and comes into contact with the opposite surface 1B of the substrate 1 to transport the substrate 1, and folds back the substrate 1 guided toward the central portion of the drying device 10, toward an outside of the drying device 10.

The air roll 18 is an example of an air bar, and functions as a noncontact direction changing device that guides the substrate 1 on a guide surface of an outer surface in a noncontact manner to change a traveling direction of the substrate 1.

In the drying device 10, the substrate 1 transported by the folding-back roller 16 is guided toward the outside of the drying device 10 by the plurality of air rolls 18, and is transported to a pass roller $\mathbf{12}_{OUT}$ on an outlet side (a downstream side of the transport path of the substrate 1) of the drying device 10. In the substrate 1 transported to the outside of the drying device 10 by the pass rollers $\mathbf{12}_{OUT}$, the liquid applied to the liquid application surface 1A is dried. The drying refers to a state where, for example, in a case in which the liquid is an ink, the ink on the liquid application surface 1A of the substrate 1 does not show through on the opposite surface 1B in a case in which the substrate 1 is wound.

As described above, the drying device 10 dries the liquid applied to the liquid application surface 1A while transporting the substrate 1 without contacting the liquid application surface 1A of the substrate 1.

First Embodiment

[Configuration of Air Roll]

Figure 2:
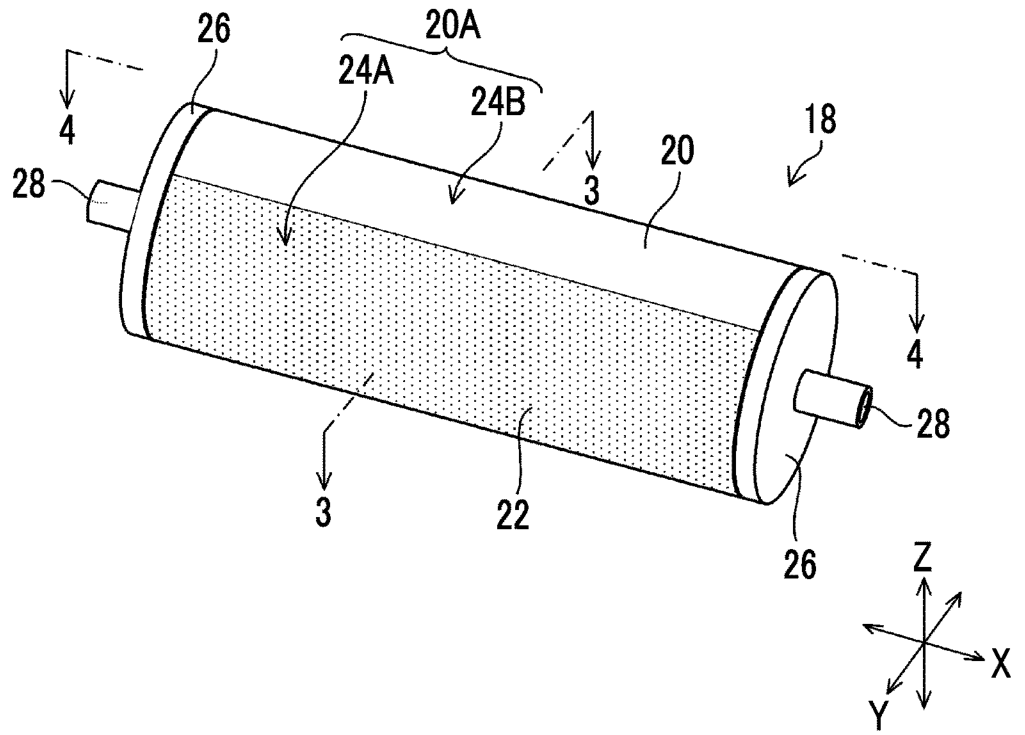
FIG. 2 is a perspective view of an air roll.

FIG. 2 is a perspective view of the air roll 18. In addition, FIG. 3 is a cross-sectional view taken along the line 3-3 of FIG. 2, and FIG. 4 is a cross-sectional view taken along the line 4-4 of FIG. 2.

Figure 3:
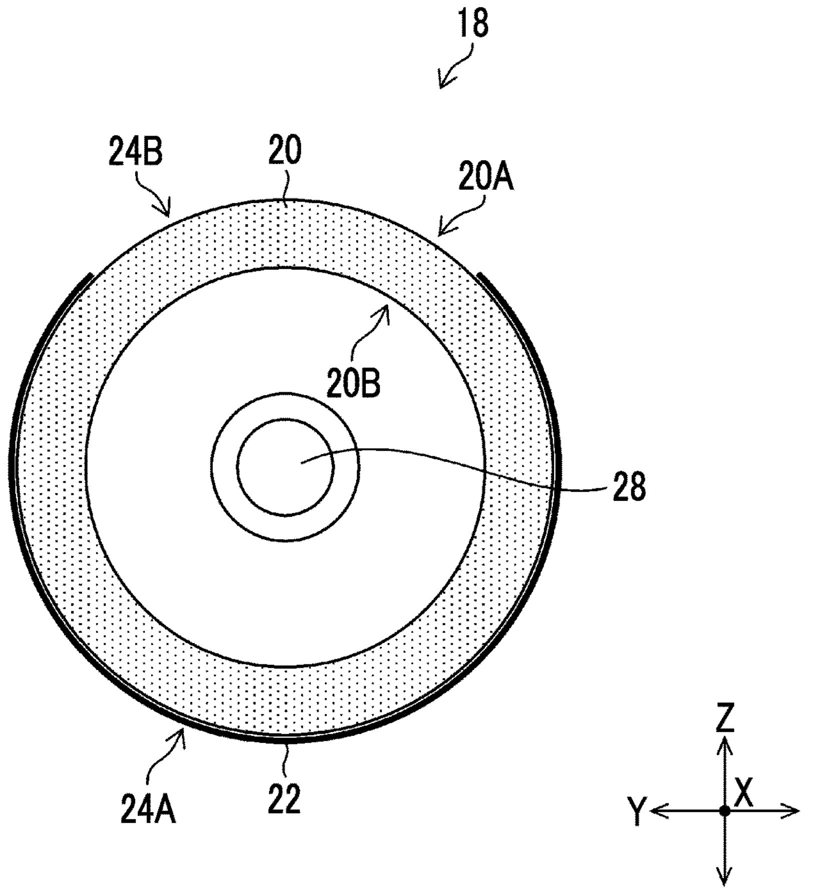
FIG. 3 is a cross-sectional view taken along the line 3-3 of FIG. 2.
Figure 4:
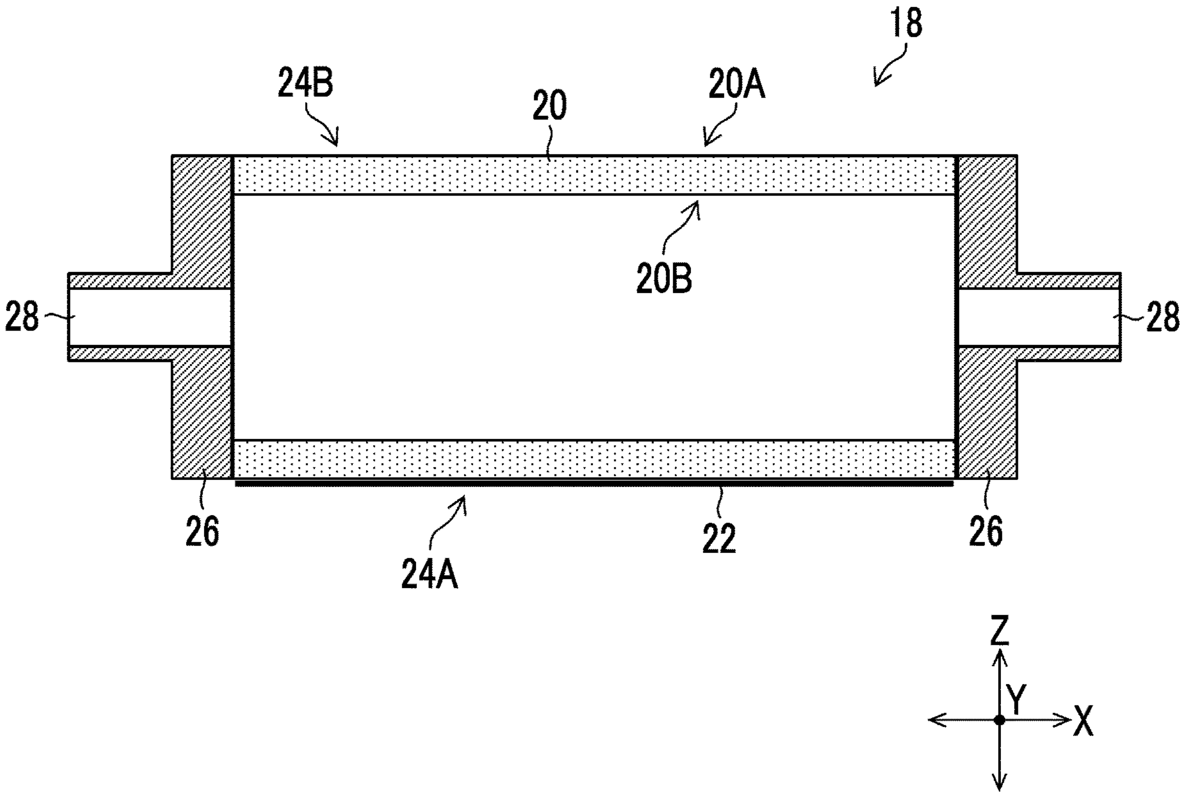
FIG. 4 is a cross-sectional view taken along the line 4-4 of FIG. 2.

As shown in FIGS. 2, 3, and 4, the air roll 18 comprises a body part 20, flanges 26, and an air supply port 28.

The body part 20 is made of a porous body, and has a cylindrical shape (an example of a tubular shape) comprising a first outer peripheral surface 20A and a first inner peripheral surface 20B. The porous body has a plurality of first holes (not shown) penetrating the first outer peripheral surface 20A and the first inner peripheral surface 20B. The porous body is a carbon porous body, a metal porous body, or a resin porous body. The resin porous body contains any one of polyethylene (PE), polypropylene (PP), or polytetrafluoroethylene (PTFE). In a case in which the air roll 18 is used in a drying furnace at a higher temperature, PTFE is selected as the resin porous body.

In the present embodiment, the body part 20 is a porous pipe made of ultra-high precision polyethylene (PE) with an average pore diameter of 10 μm. The porous pipe has, for example, an outer diameter of φ70 mm and an inner diameter of φ40 mm.

The flanges 26 are installed upright at both side ends of the body part 20, respectively. The flange 26 is provided with the air supply port 28. The air supply port 28 (an example of an air supply mechanism part) is an opening portion for supplying air to an inside of the body part 20, that is, to an inside of the first inner peripheral surface 20B of the body part 20. An air supply pipe (not shown) is connected to the air supply port 28, and a blower fan (not shown) is connected to the air supply pipe. The blower fan supplies air to the inside of the body part 20. Compressed air may be supplied from a compressor instead of the blower fan.

The flange 26 functions as a cover part that prevents outflow of the air from both side ends of the body part 20. Here, although the air supply port 28 is provided in each of two flanges 26, the air supply port 28 may be provided in only one flange 26.

The first outer peripheral surface 20A of the body part 20 constitutes the outer surface of the air roll 18. The first outer peripheral surface 20A includes a first non-jetting region 24A in which the first holes are closed by a closing member 22 and from which the air supplied from the air supply port 28 is not jetted, and a first jetting region 24B, which is a region other than the first non-jetting region 24A, from which the air supplied from the air supply port 28 is jetted.

The closing member 22 is provided along an axial direction (here, an X direction) of the tubular shape of the body part 20. In the present embodiment, the closing member 22 is an olefin-based resin that is surface-coated on the first outer peripheral surface 20A. The closing member 22 may be a sealing member stuck to the first outer peripheral surface 20A or a substance whose physical properties have been changed by treatment such as remelting the first outer peripheral surface 20A. In addition, an object different in ventilation property from the porous body of the body part 20 may be assembled to the first outer peripheral surface 20A.

Note that it is desirable that the closing member 22 is not colorless but is colored in a color different from that of the first outer peripheral surface 20A. By forming the first non-jetting region 24A and the first jetting region 24B in different colors, it is possible to improve workability in a case in which the air roll 18 is assembled to the drying device 10 and in a case in which the air roll 18 incorporated in the drying device 10 is adjusted.

In the present embodiment, the first jetting region 24B of the body part 20 constitutes the guide surface of the air roll 18, and the first non-jetting region 24A of the body part 20 constitutes the outer surface of the air roll 18 other than the guide surface. The first outer peripheral surface 20A of the body part 20 may be covered with a member having a ventilation property. In this case, the first jetting region 24B of the body part 20 is disposed at a position corresponding to the guide surface of the air roll 18, and the first non-jetting region 24A of the body part 20 is disposed at a position corresponding to the outer surface of the air roll 18 other than the guide surface.

The air supplied from the air supply port 28 to the inside of the body part 20 passes from the first inner peripheral surface 20B toward the first outer peripheral surface 20A through the plurality of first holes, and is jetted from the first jetting region 24B of the first outer peripheral surface 20A. Thereby, the air roll 18 guides the substrate 1 by causing the substrate 1 to float from the guide surface formed by the first jetting region 24B by a predetermined floating height, and changes the traveling direction of the substrate 1. In addition, in the first non-jetting region 24A of the first outer peripheral surface 20A, the jetting of the air is suppressed by the closing member 22. In this way, by providing the first non-jetting region 24A on the outermost surface of the air roll 18, air to be consumed can be concentrated on the first jetting region 24B which is the guide surface.

Figure 5:
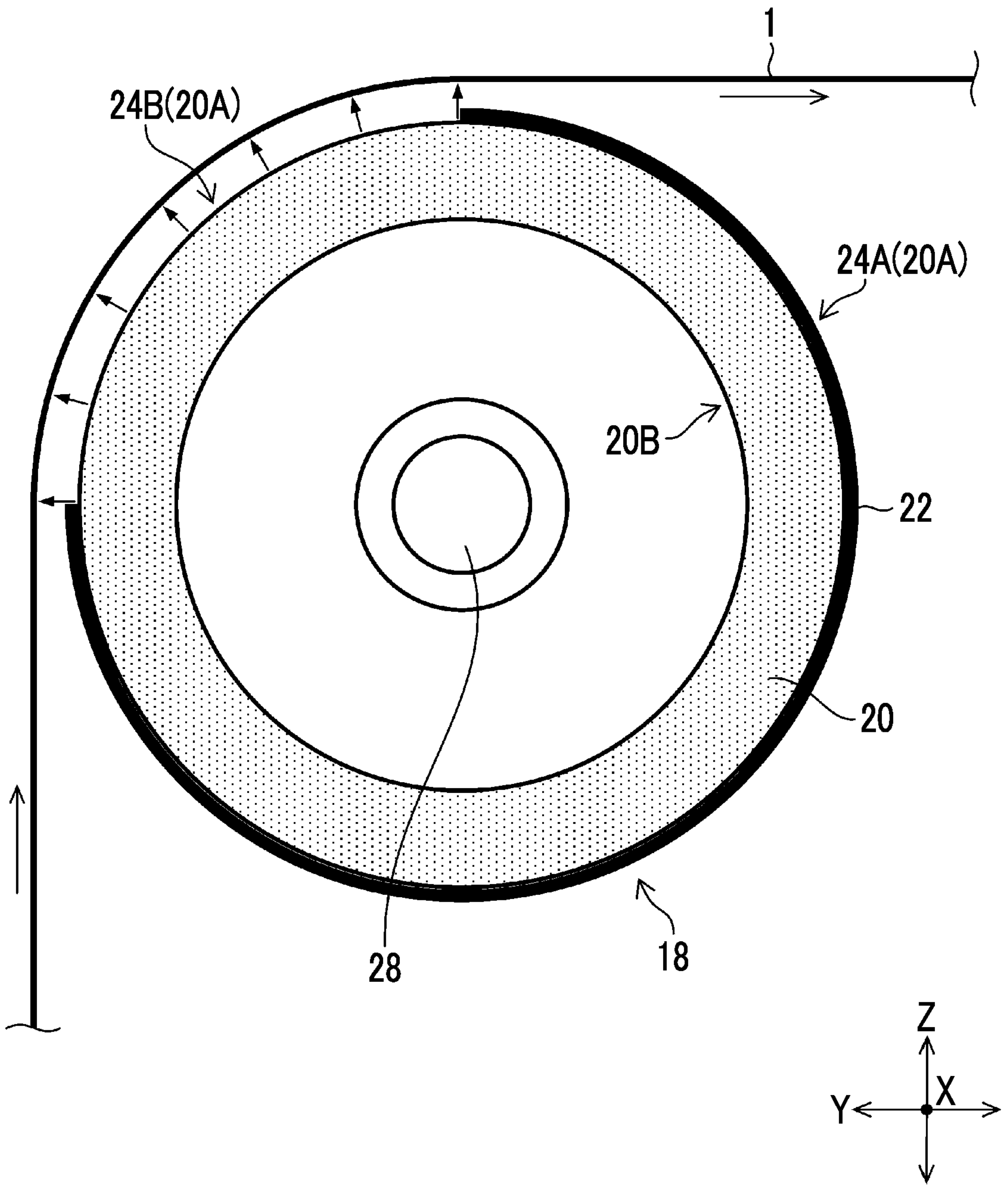
FIG. 5 is a schematic view showing a state in which a substrate is guided by the air roll.

FIG. 5 is a schematic view showing a state in which the substrate 1 is guided by the air roll 18. The air roll 18 shown in FIG. 5 changes the traveling direction of the substrate 1 by 90 degrees. Here, in the air roll 18, about ¾ periphery of the first outer peripheral surface 20A of the body part 20 is the first non-jetting region 24A, and about ¼ periphery thereof is the first jetting region 24B.

Figure 6:
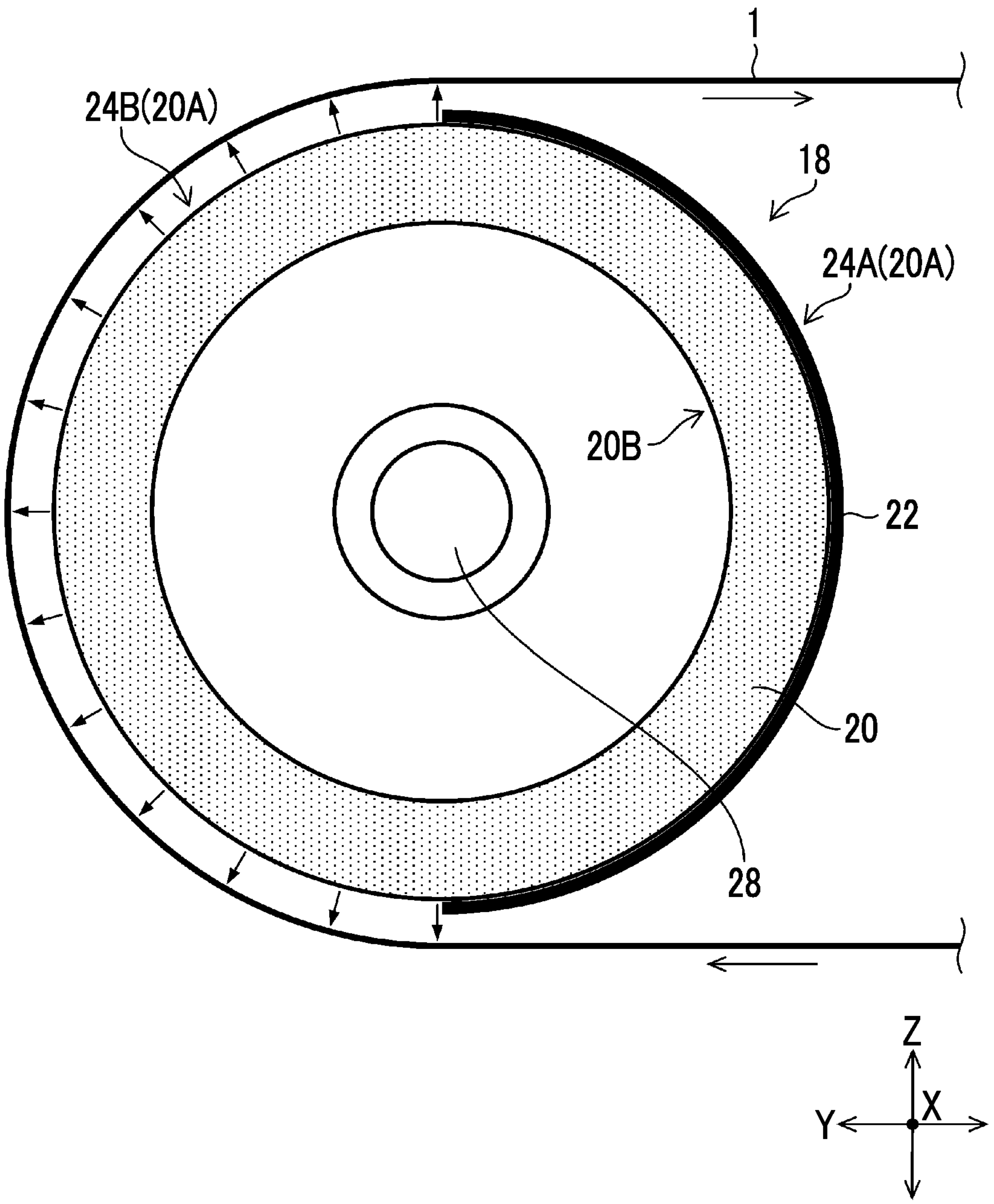
FIG. 6 is a schematic view showing a state in which the substrate is guided by the air roll.

An angle of the traveling direction of the substrate 1 changed by the air roll 18 is not limited to 90 degrees. FIG. 6 is a schematic view showing a state in which the substrate 1 is guided by the air roll 18. The air roll 18 shown in FIG. 6 changes the traveling direction of the substrate 1 by 180 degrees. Here, in the air roll 18, about ½ periphery of the first outer peripheral surface 20A of the body part 20 is the first non-jetting region 24A, and about ½ periphery thereof is the first jetting region 24B.

In addition, although an example in which the traveling direction of the substrate 1 and the axial direction of the air roll 18 are orthogonal to each other has been described here, the traveling direction of the substrate 1 and the axial direction of the air roll 18 form an angle other than the perpendicular angle. For example, by disposing the axial direction of the air roll 18 at an angle of 45 degrees from the traveling direction of the substrate 1 in a plane of the substrate 1, the traveling direction of the substrate 1 can be changed by 90 degrees in the plane of the substrate 1. In this case, ranges of the first non-jetting region 24A and the first jetting region 24B need only be determined by using a surface, which faces the substrate 1, of the outer surface of the air roll 18 as the guide surface. In this way, by determining the ranges of the first non-jetting region 24A and the first jetting region 24B according to the orientation and angle of the traveling direction of the substrate 1, the substrate 1 can be guided in any transport path.

Figure 7:
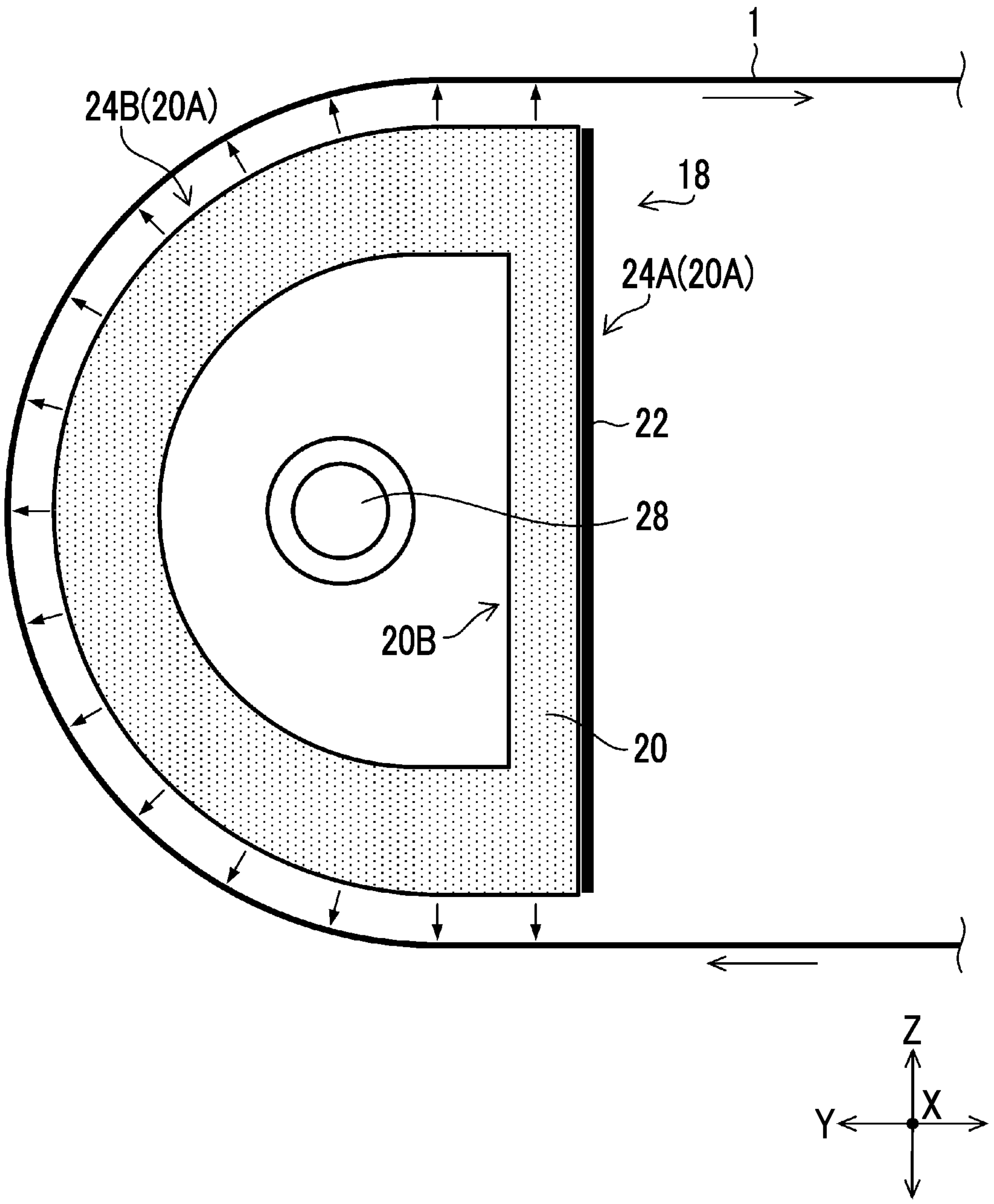
FIG. 7 is a schematic view showing a state in which the substrate is guided by the air roll.

In addition, the air roll 18 is not limited to the cylindrical shape, and may have other shapes. FIG. 7 is a schematic view showing a state in which the substrate 1 is guided by the semi-cylindrical air roll 18 having a D-shaped cross section. In the example shown in FIG. 7, in the body part 20, a plane portion of the first outer peripheral surface 20A is the first non-jetting region 24A, and a curved surface portion is the first jetting region 24B. Here, since the traveling direction of the substrate 1 is changed by 180 degrees, the entire curved surface portion constitutes the first jetting region 24B, but only a part of the curved surface portion may constitute the first jetting region 24B according to the angle at which the traveling direction is changed. The air roll 18 may have a rectangular tubular shape in which a side ridge line portion of the outer peripheral surface is chamfered into a curved shape.

The body part 20 need only have a tubular shape in a state where the air roll 18 is configured, and the present aspect also includes a case in which the body part 20 is formed into a tubular shape by rounding or bending a flat plate-shaped porous body with one surface as the outer peripheral surface and the other side as the inner peripheral surface.

Second Embodiment

[Configuration of Air Roll]

Figure 8:
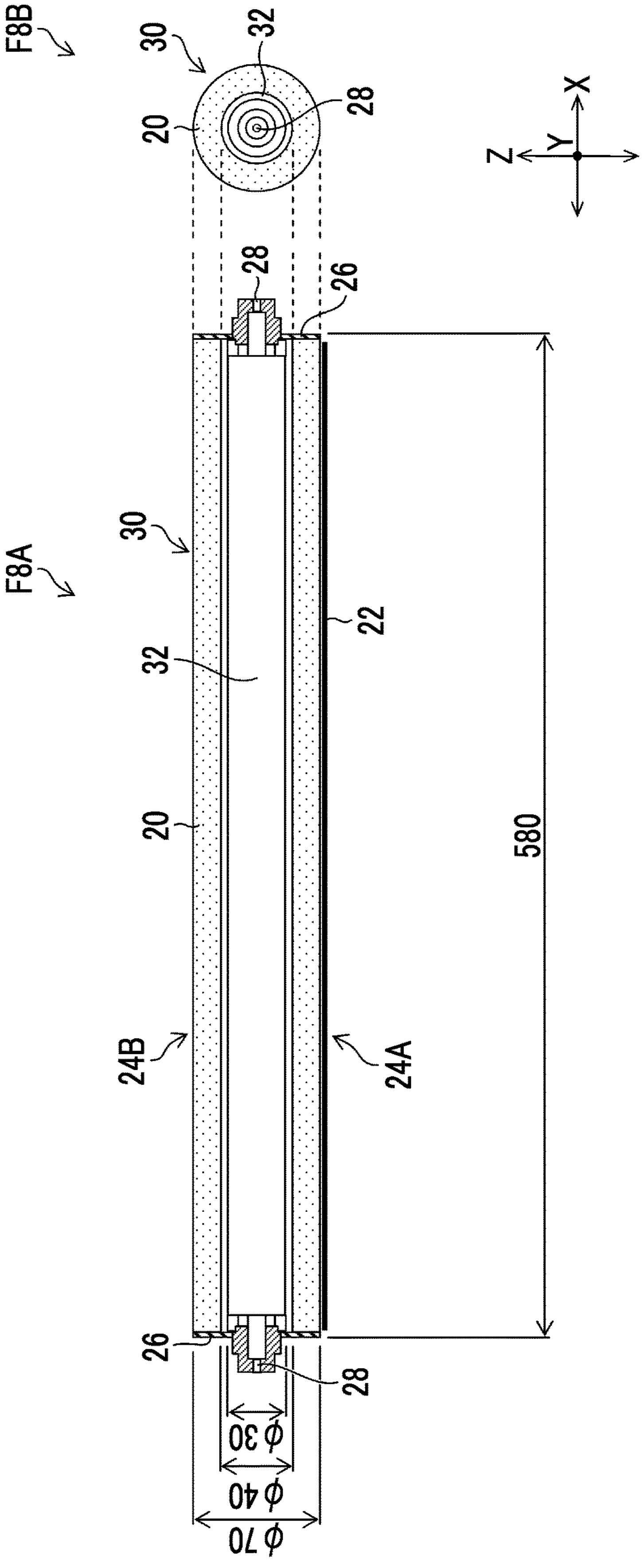
FIG. 8 is a diagram showing an air roll.

FIG. 8 is a diagram showing an air roll 30 according to a second embodiment. In FIG. 8, F8A is a cross-sectional view taken in the same direction as in FIG. 4, and F8B is a cross-sectional view taken in the same direction as in FIG. 3. Here, the same reference numerals are given to the parts common to the air roll 18, and detailed description thereof will be omitted. The air roll 30 has a length of 580 mm in a direction corresponding to a width of the substrate 1. In addition, the body part 20 has a length of about 580 mm in the direction corresponding to the width of the substrate 1, an outer diameter of φ70 mm, and an inner diameter of φ40 mm. The width of the substrate 1 is a length in a direction orthogonal to the traveling direction of the substrate 1.

Figure 9:
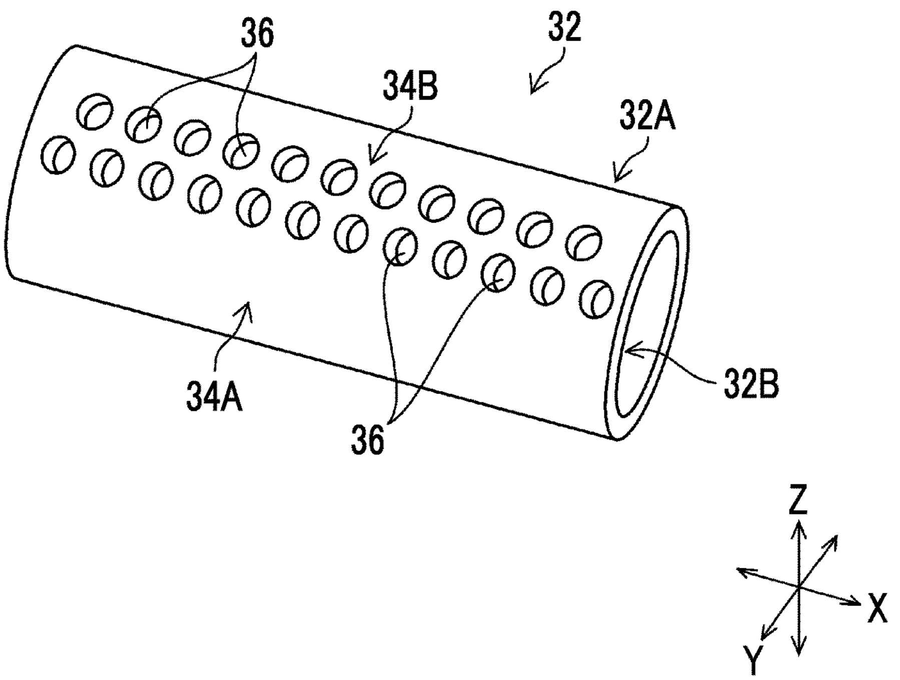
FIG. 9 is a perspective view of an aluminum core metal.

The air roll 30 has an aluminum core metal 32 inside the body part 20. FIG. 9 is a perspective view of the aluminum core metal 32. The aluminum core metal 32 (an example of a perforated container) is made of aluminum, and has a cylindrical shape comprising a second outer peripheral surface 32A and a second inner peripheral surface 32B. Here, the aluminum core metal 32 has a length of about 580 mm in the direction corresponding to the width of the substrate 1 and an outer diameter of φ30 mm.

The second outer peripheral surface 32A includes a second non-jetting region 34A and a second jetting region 34B. A plurality of second holes 36 penetrating the second outer peripheral surface 32A and the second inner peripheral surface 32B are disposed in the second jetting region 34B, and the second holes 36 are not disposed in the second non-jetting region 34A. The second jetting region 34B is disposed at a position corresponding to the guide surface of the air roll 30, and the second non-jetting region 34A is disposed at a position corresponding to the outer surface of the air roll 30 other than the guide surface. That is, the second jetting region 34B of the aluminum core metal 32 is disposed on an inner peripheral surface side of the first jetting region 24B of the body part 20, and the second non-jetting region 34A of the aluminum core metal 32 is disposed on an inner peripheral surface side of the first non-jetting region 24A of the body part 20.

As described above, with the air roll 30 having the aluminum core metal 32, it is possible to suppress the deformation of the outer surface in a case in which force is applied to the outer surface during the transport of the substrate 1 and the maintenance of the air roll 18. Here, the aluminum core metal 32 has a cylindrical shape, but in a case in which the cross section of the body part 20 is not the cylindrical shape, the aluminum core metal 32 need only have a shape that matches the cross-sectional shape of the body part 20. In addition, a material of the perforated container disposed inside the body part 20 is not limited to aluminum, and need only be made of a material having relatively higher strength than the porous body.

<Flotation Evaluation>

Figure 10:
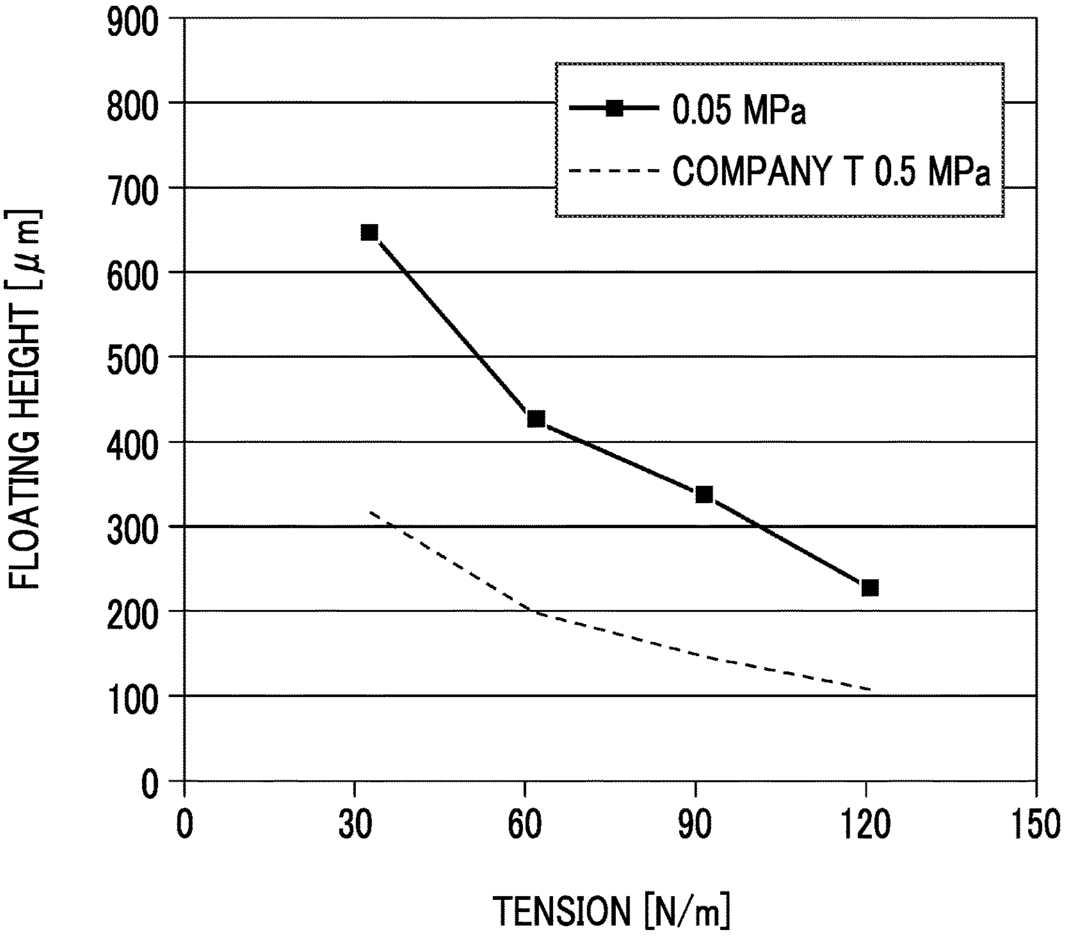
FIG. 10 is a graph showing results of a flotation evaluation.

The floating height of the substrate 1 guided by the air roll 30 was evaluated. FIG. 10 is a graph showing results of the flotation evaluation. Here, air at a pressure of 0.05 MPa was supplied from the air supply port 28, and the respective floating heights [μm] of the substrate 1 in a case in which tensions of 30, 60, 90, and 120 N/m were applied to the substrate 1 were measured by using a laser displacement meter. As the substrate 1, a polyethylene terephthalate (PET) sheet having a width of 400 mm and a thickness of 25 μm was used. Note that the thickness of the substrate 1 is a length in a direction orthogonal to the liquid application surface 1A.

As shown in FIG. 10, in a case in which the air roll 30 was used, the floating height of the substrate 1 in a case in which the tension was 30 N/m was 650 μm, the floating height of the substrate 1 in a case in which the tension was 60 N/m was 430 μm, the floating height of the substrate 1 in a case in which the tension was 90 N/m was 340 μm, and the floating height of the substrate 1 in a case in which the tension was 120 N/m was 230 μm.

FIG. 10 shows a result of measuring the floating height in the same manner using an air roll of a carbon porous body as another example. Air at a pressure of 0.5 MPa was supplied to the air roll. As shown in FIG. 10, in a case in which the air roll of the carbon porous body was used, the floating height in a case in which the tension was 30 N/m was 320 μm, the floating height in a case in which the tension was 60 N/m was 200 μm, the floating height in a case in which the tension was 90 N/m was 150 μm, and the floating height in a case in which the tension was 120 N/m was 110 μm.

In this way, it was found that, by using the air roll 30 or the air roll of the carbon porous body, it is possible to suppress the amount of air consumption and increase the floating height. In particular, the air roll 30 formed of the resin porous body resulted in a large floating height even though the pressure of the supplied air is one order of magnitude lower.

Modification Example

Figure 11:
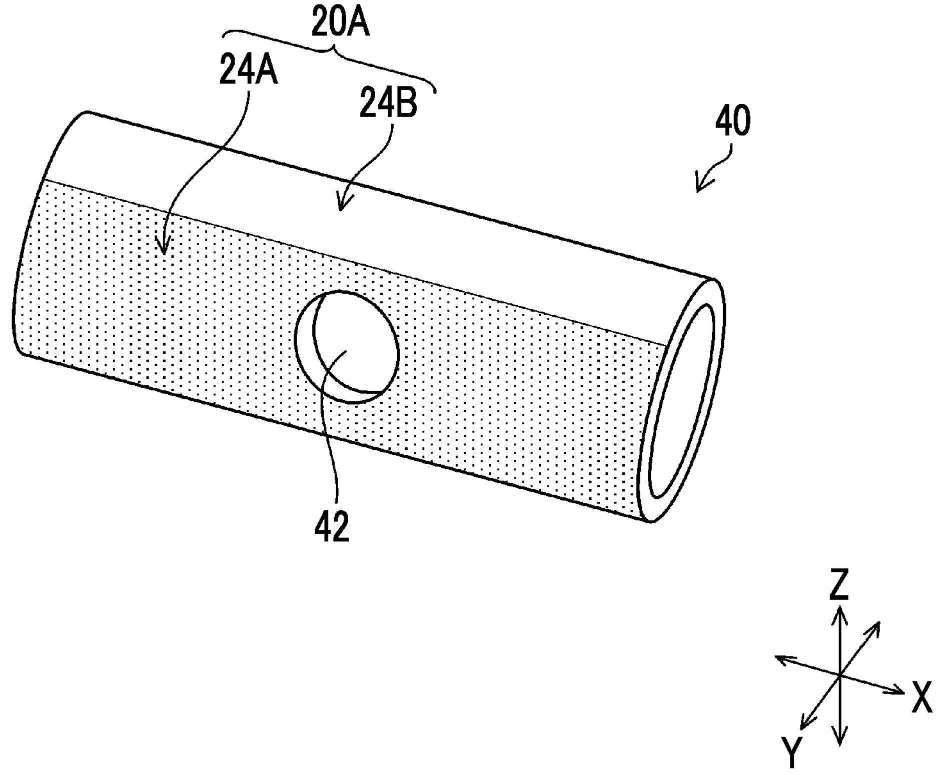
FIG. 11 is a perspective view of a body part.

The supply of air to the inside of the air roll is not limited to the aspect in which the air is supplied from the flange. FIG. 11 is a perspective view of a body part 40 according to a modification example. The body part 40 comprises an air supply port 42 penetrating the first outer peripheral surface 20A and the first inner peripheral surface 20B in the first non-jetting region 24A.

Figure 12:
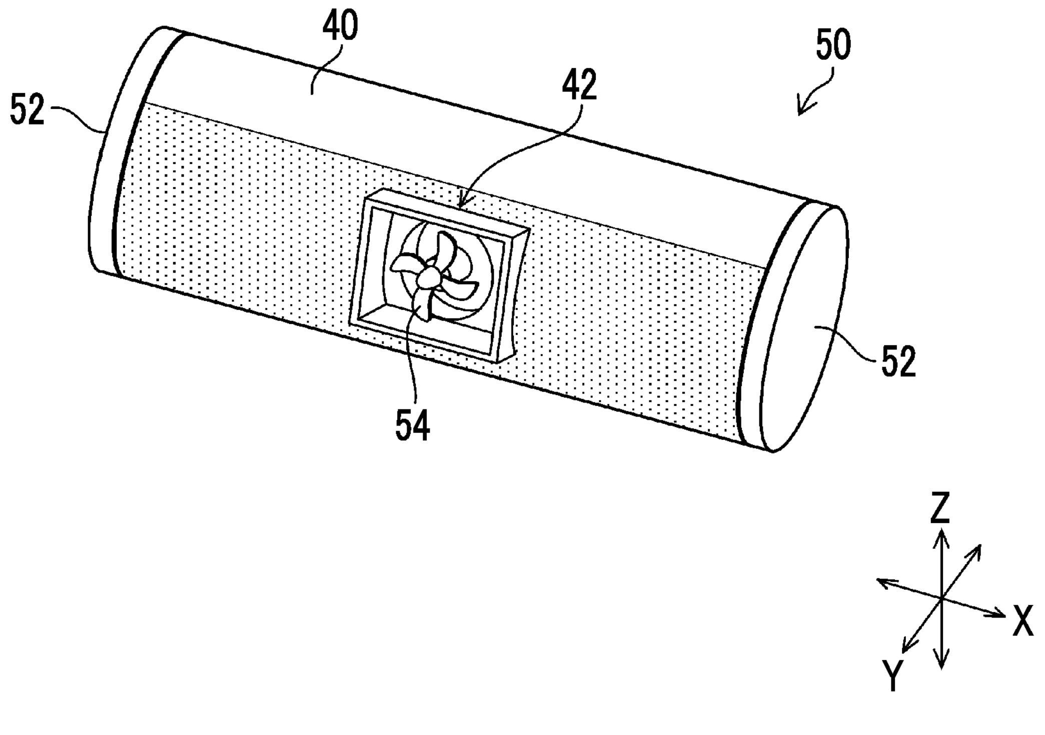
FIG. 12 is a perspective view of an air roll.

FIG. 12 is a perspective view of an air roll 50 formed of the body part 40. Flanges 52 are installed upright at both side ends of the air roll 50, respectively. The flange 52 does not comprise an air supply port. In addition, an axial fan 54 is provided in the air supply port 42 of the air roll 50. Air is supplied to an inside of the body part 40 from the axial fan 54.

In this way, the air may be supplied from the air supply port 42 provided in the first non-jetting region 24A. In a case in which the aluminum core metal 32 is provided inside the body part 20, an air supply port penetrating the second outer peripheral surface 32A and the second inner peripheral surface 32B need only be provided in the aluminum core metal 32, and the air supply port of the aluminum core metal 32 need only be disposed at a position corresponding to the air supply port 42 of the body part 40.

In addition, in a case in which the body part is formed of a resin porous body, a surface of the resin porous body is likely to be charged, which may adversely affect the transport of the substrate 1. Therefore, it is preferable to suppress charging of the air roll.

Figure 13:
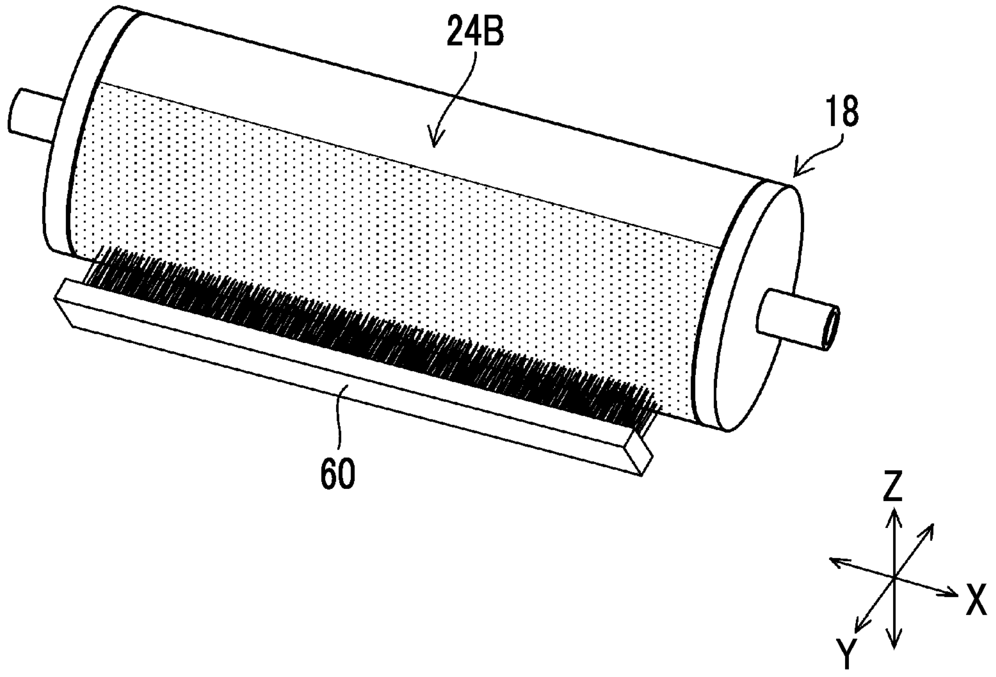
FIG. 13 is a schematic view showing a static elimination brush.

FIG. 13 is a schematic view showing a static elimination brush 60 that eliminates static electricity from the first non-jetting region 24A of the air roll 18. The static elimination brush 60 is configured such that a brush portion formed of conductive fibers abuts on the first non-jetting region 24A during the transport of the substrate 1 and is movable in the axial direction of the air roll 18 and in a direction orthogonal to the axial direction. Thereby, the brush portion can abut on the entire first non-jetting region 24A of the air roll 18.

Figure 14:
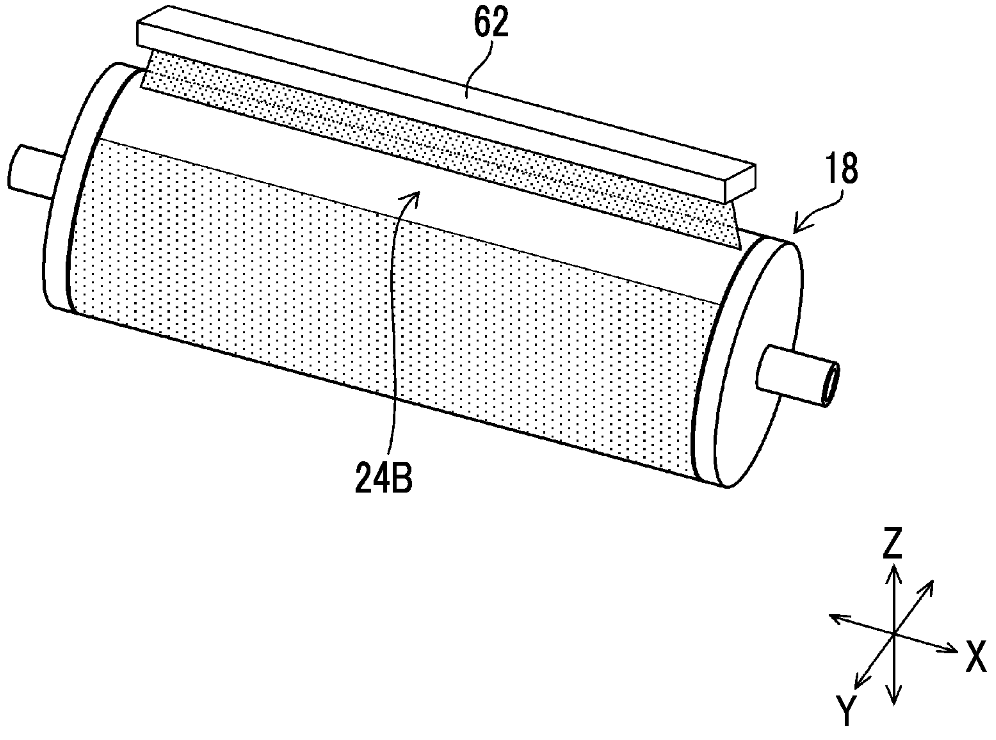
FIG. 14 is a schematic view showing an ionizer.

In addition, FIG. 14 is a schematic view showing an ionizer 62 that eliminates static electricity from the first jetting region 24B constituting the guide surface of the air roll 18. The ionizer 62 may be configured to be movable in the axial direction of the air roll 18 and in a direction orthogonal to the axial direction. The ionizer 62 generates ions by discharge and supplies the generated ions to the first jetting region 24B. Thereby, the ionizer 62 can eliminate static electricity from the guide surface (first jetting region 24B) during the transport of the substrate 1.

In this way, by eliminating static electricity from the guide surface of the air roll 18, it is possible to suppress the adverse effect of the charging of the air roll 18 on the transport of the substrate 1. On the other hand, the substrate 1 may also be charged using the charging of the air roll 18 to transport the substrate 1 by using electrostatic repulsion.

Figure 15:
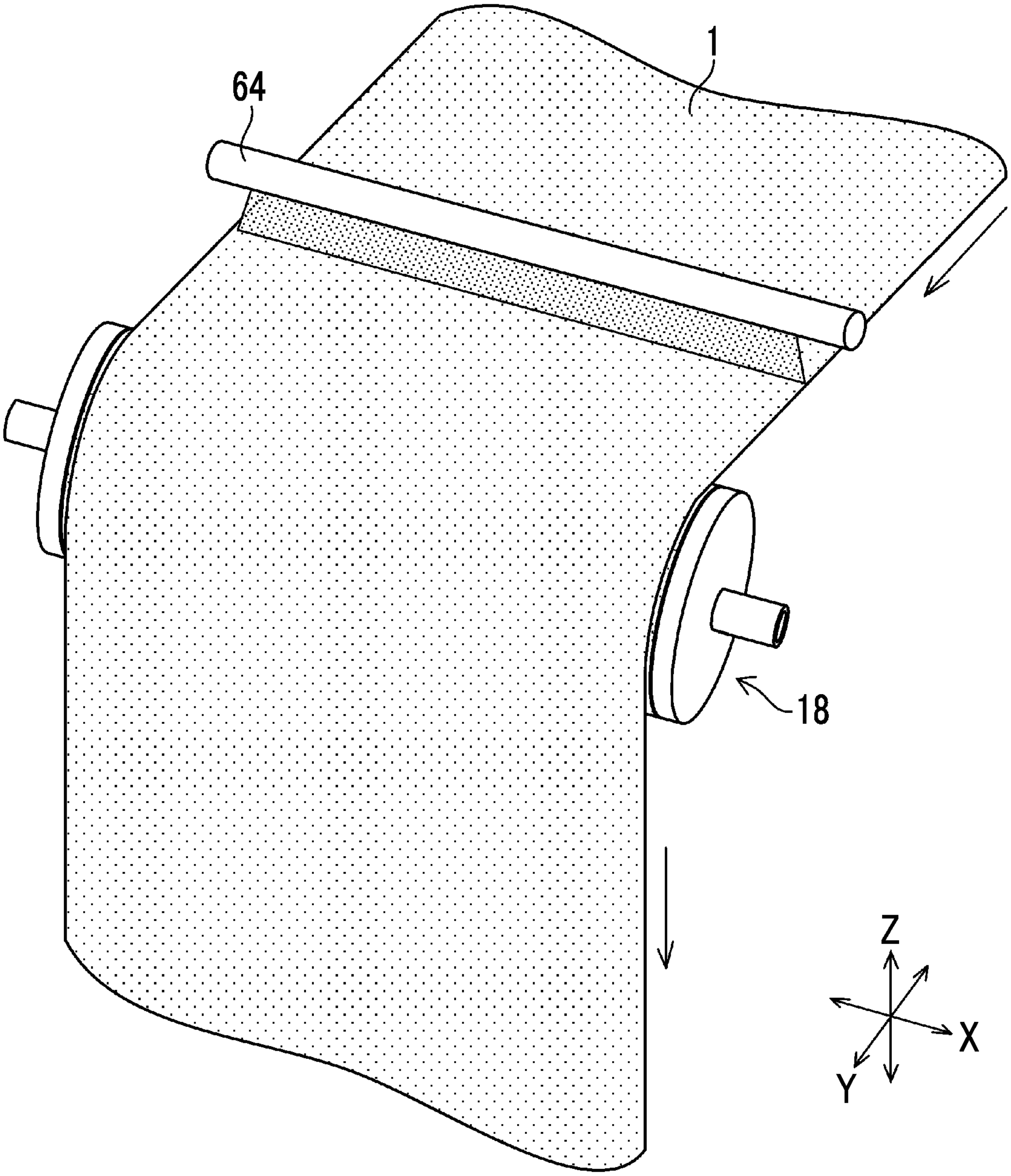
FIG. 15 is a schematic view showing a charging device.

FIG. 15 is a schematic view showing a charging device 64 that charges the substrate 1. The charging device 64 is, for example, a noncontact charging roller. The charging device 64 is disposed to face the liquid application surface 1A of the substrate 1 on an upstream side of the air roll 18 in the transport path of the substrate 1. The charging device 64 has a length longer than the width of the substrate 1, and uniformly charges the facing substrate 1 to a required potential of a required polarity in a noncontact manner. The polarity with which the substrate 1 is charged is the same as the polarity with which the air roll 18 is charged. Thereby, the substrate 1 can be transported in a noncontact manner by using electrostatic repulsion.

The charging device 64 may be a contact charging roller that comes into contact with the opposite surface 1B of the substrate 1 to charge the substrate 1.

<Printing Apparatus>

[Configuration of Ink Jet Printing Apparatus]

Figure 16:
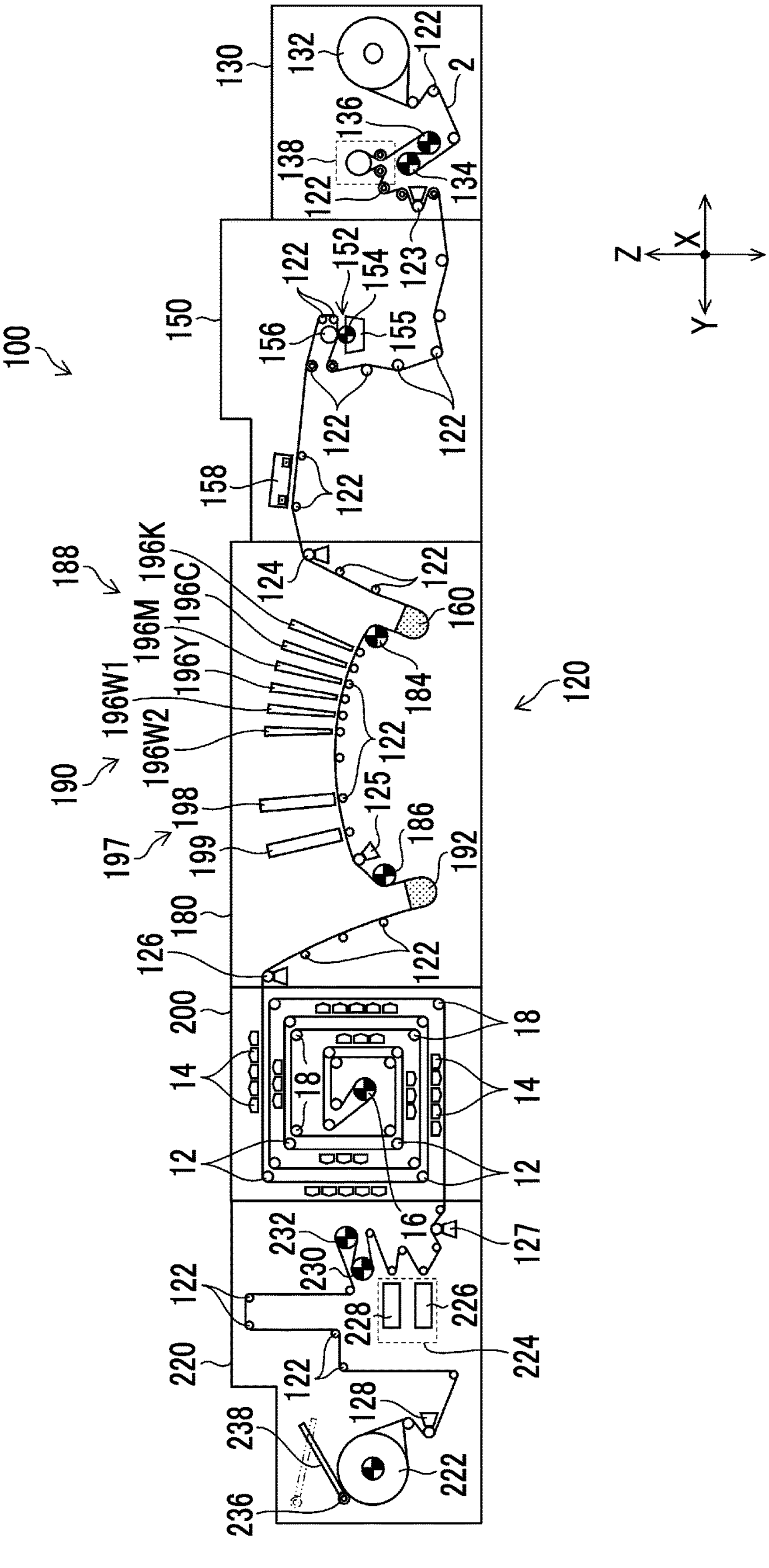
FIG. 16 is an overall configuration diagram of an ink jet printing apparatus.

FIG. 16 is an overall configuration diagram of an ink jet printing apparatus 100 to which the drying device 10 is applied. The ink jet printing apparatus 100 is a printing apparatus that prints an image on a web-shaped film substrate 2, which is an impermeable medium, by a single pass method. The film substrate 2 is a transparent medium used for soft packaging. The film substrate 2 is, for example, oriented nylon (ONY), oriented polypropylene (OPP), or PET. The ink jet printing apparatus 100 produces a reverse-printed matter of which a printing target can be visually recognized from an opposite surface, which is a back surface, of a printing surface with respect to the film substrate 2.

Note that the term "impermeable" refers to having impermeability with respect to an aqueous primer and an aqueous ink, which will be described below. The term "soft packaging" refers to packaging formed of a material that deforms depending on a shape of an article to be packaged. The term "transparent" refers to having a visible light transmittance equal to or higher than 30% and equal to or lower than 100%, preferably a visible light transmittance equal to or higher than 70% and equal to or lower than 100%.

As shown in FIG. 16, the ink jet printing apparatus 100 comprises a transport section 120, an unwinding section 130, a pre-coating section 150, a jetting section 180, a main drying section 200, and a winding section 220.

[Transport Section]

The transport section 120 transports the film substrate 2 from the unwinding section 130 to the winding section 220 along a transport path.

The unwinding section 130 comprises an unwinding roll 132. The unwinding roll 132 comprises a reel (not shown) that is rotatably supported. The film substrate 2 on which an image is not yet printed is wound around the reel in a roll shape. On the other hand, the winding section 220 comprises a winding roll 222. The winding roll 222 comprises a reel (not shown) that is rotatably supported. One end of the film substrate 2 is connected to the reel. The winding roll 222 comprises a winding motor (not shown) that rotationally drives the reel.

The transport section 120 comprises a plurality of pass rollers 122 that function as guide rollers. The transport section 120 transports the film substrate 2 by the plurality of pass rollers 122, a first suction drum 184, a first drive roller 134, a coating roller 154, a second suction drum 186, the folding-back roller 16 corresponding to a third drive roller, a fourth drive roller 230, and the winding roll 222.

Further, the transport section 120 detects transport tensions of the film substrate 2 by a first tension pickup roller 123, a second tension pickup roller 124, a third tension pickup roller 125, a fourth tension pickup roller 126, a fifth tension pickup roller 127, and a sixth tension pickup roller 128. The transport tension is tensile force that is received by the film substrate 2 in a traveling direction of the film substrate 2.

The transport section 120 rotationally drives the first suction drum 184 by a motor (not shown), and unwinds the film substrate 2 from the unwinding roll 132. In addition, the transport section 120 rotationally drives the reel of the winding roll 222 by the winding motor, and winds the printed film substrate 2 around the winding roll 222.

The transport section 120 guides the film substrate 2 unwound from the unwinding roll 132 by using the pass rollers 122 and the like, and transports the film substrate 2 to the unwinding section 130, the pre-coating section 150, the jetting section 180, the main drying section 200, and the winding section 220 in this order.

As described above, the film substrate 2 is transported by the transport section 120 in a roll-to-roll manner along a transport path from the unwinding roll 132 to the winding roll 222. Hereinafter, the transport path of the film substrate 2 will be simply referred to as a "transport path".

[Unwinding Section]

The unwinding section 130 comprises the unwinding roll 132, the first drive roller 134, a second drive roller 136, and a corona treatment unit 138. The pass rollers 122, 122, . . . are disposed on the transport path of the unwinding section 130. The film substrate 2 unwound from the unwinding roll 132 is transported to the first drive roller 134 by being guided by the pass rollers 122, 122.

The first drive roller 134 is rotated by a motor (not shown), and comes into contact with the film substrate 2 to transport the film substrate 2. The film substrate 2 transported by the first drive roller 134 is transported to the second drive roller 136. The second drive roller 136 is rotated by a motor (not shown), and comes into contact with the film substrate 2 to transport the film substrate 2.

The film substrate 2 transported by the second drive roller 136 is transported to a position facing the corona treatment unit 138.

The corona treatment unit 138 is disposed upstream of the pre-coating section 150 in the transport path. The corona treatment unit 138 performs corona discharge treatment on a printing surface of the film substrate 2, and improves adhesiveness between a water-repellent printing surface, and an aqueous primer and aqueous ink.

The film substrate 2 of which the printing surface has been reformed by the corona treatment unit 138 is guided by the pass rollers 122, 122 to be transported to the first tension pickup roller 123. The film substrate 2 of which the transport tension has been detected by the first tension pickup roller 123 is guided by the pass rollers 122 to be transported from the unwinding section 130 to the pre-coating section 150.

[Pre-Coating Section]

The pre-coating section 150 is disposed upstream of the jetting section 180 in the transport path. The pre-coating section 150 applies an aqueous primer to the printing surface of the film substrate 2. The aqueous primer is a liquid containing water and a component that aggregates, insolubilizes, or thickens a coloring material component in an aqueous ink, and is thickened by reaction between an aqueous color ink and an aqueous white ink.

The pre-coating section 150 comprises a coater 152 and a precoat (PC) drying unit 158. The pass rollers 122, 122, . . . are disposed on the transport path of the pre-coating section 150. The film substrate 2 transported from the unwinding section 130 is guided by the pass rollers 122, 122, . . . to be transported to a position facing the coater 152.

The coater 152 is a chamber doctor type coater. The coater 152 comprises the coating roller 154, a chamber 155, an opposing roller 156, and a blade (not shown). The coating roller 154 is rotated by a motor (not shown). An aqueous primer is stored in the chamber 155. The coater 152 supplies the aqueous primer from the chamber 155 to a surface of the rotating coating roller 154. The blade scrapes off an excess aqueous primer on the surface of the rotating coating roller 154. The coating roller 154 interposes the film substrate 2 between the opposing roller 156 and the coating roller 154, and the surface of the coating roller 154 to which the aqueous primer is supplied abuts on the printing surface of the film substrate 2 so that the printing surface of the film substrate 2 is coated with the aqueous primer supplied to the surface.

The film substrate 2 coated with the aqueous primer is guided by the pass rollers 122, 122, . . . to be transported to a position facing the PC drying unit 158.

The PC drying unit 158 corresponds to a precoat (PC) drying unit that dries the aqueous primer applied to the printing surface of the film substrate 2 by the pre-coating section 150. The PC drying unit 158 comprises a hot air heater (not shown). The hot air heater has two slit nozzles (not shown) that extend over the entire width of the film substrate 2. The PC drying unit 158 blows hot air from the slit nozzles of the hot air heater toward the printing surface of the film substrate 2 to dry the aqueous primer.

The film substrate 2 on which the aqueous primer is dried is transported from the pre-coating section 150 to the jetting section 180.

[Jetting Section]

The jetting section 180 prints an image on the printing surface of the film substrate 2. The jetting section 180 manages a temperature of the film substrate 2 to be 23° C. or higher and 30° C. or lower from the viewpoint of maintaining printing quality. The jetting section 180 comprises a first noncontact turn portion 160, the first suction drum 184, the second suction drum 186, a color printing portion 188, a white printing portion 190, and a second noncontact turn portion 192.

The film substrate 2 transported from the pre-coating section 150 is transported to the second tension pickup roller 124. The film substrate 2 of which the transport tension has been detected by the second tension pickup roller 124 is guided by the pass rollers 122, 122 to be transported to the first noncontact turn portion 160.

The first noncontact turn portion 160 changes the traveling direction of the film substrate 2 from a downward direction to an upward direction without contacting the printing surface of the film substrate 2. That is, the film substrate 2 guided downward by the pass roller 122 is guided upward by the first noncontact turn portion 160. The air roll 18 can be applied to the first noncontact turn portion 160.

The first noncontact turn portion 160 causes the film substrate 2 to float from the guide surface by a predetermined floating height and changes the direction of the transport path of the film substrate 2 from a downward direction to an upward direction by 180 degrees. The film substrate 2 of which the traveling direction has been changed by the first noncontact turn portion 160 is transported to the first suction drum 184.

The first suction drum 184 is disposed upstream of the color printing portion 188 and the white printing portion 190 in the transport path.

The first suction drum 184 is rotated by a motor (not shown), and transports the film substrate 2 while adsorbing the film substrate 2 onto an outer peripheral surface. The first suction drum 184 has a plurality of adsorption holes (not shown) in the outer peripheral surface. The first suction drum 184 adsorbs the film substrate 2 onto the outer peripheral surface with the adsorption holes sucked by a pump (not shown).

The film substrate 2 transported by the first suction drum 184 is supported and guided by the pass rollers 122, 122, . . . to be transported to the third tension pickup roller 125. The film substrate 2 of which the transport tension has been detected by the third tension pickup roller 125 is transported to the second suction drum 186.

The second suction drum 186 is disposed downstream of the color printing portion 188 and the white printing portion 190 in the transport path and upstream of the main drying section 200 in the transport path. The second suction drum 186 is rotated by a motor (not shown), and transports the film substrate 2 while adsorbing the film substrate 2 onto an outer peripheral surface. The configuration of the second suction drum 186 is the same as that of the first suction drum 184.

The color printing portion 188, the white printing portion 190, and an examination portion 197 are disposed in the transport path between the first suction drum 184 and the second suction drum 186. That is, the first suction drum 184 and the second suction drum 186 are disposed before and after the color printing portion 188, the white printing portion 190, and the examination portion 197. The reason why the first suction drum 184 and the second suction drum 186 are disposed before and after the color printing portion 188, the white printing portion 190, and the examination portion 197 is to set the transport tension for the film substrate 2 without contacting the printing surface of the film substrate 2.

The film substrate 2 transported from the first suction drum 184 is transported to a position facing the color printing portion 188. The color printing portion 188 applies an aqueous color ink to the printing surface of the film substrate 2 to print a color image. The color printing portion 188 comprises ink jet heads 196K, 196C, 196M, and 196Y.

The ink jet heads 196K, 196C, 196M, and 196Y jet black (K), cyan (C), magenta (M), and yellow (Y) aqueous inks, respectively. The aqueous ink refers to an ink obtained by dissolving or dispersing water and a coloring material, such as a dye and a pigment, in a solvent soluble in water. As the pigment of each aqueous ink, an organic pigment is used. A viscosity of each aqueous ink is 0.5 cP or more and 5.0 cP or less. The aqueous ink is supplied to each of the ink jet heads 196K, 196C, 196M, and 196Y from an ink tank (not shown) of a corresponding color via a pipe path (not shown).

Each of the ink jet heads 196K, 196C, 196M, and 196Y is configured of a line type recording head that can perform printing on the film substrate 2 transported by the transport section 120 with one scanning. The ink jet heads 196K, 196C, 196M, and 196Y are disposed such that nozzle surfaces (not shown) face the pass rollers 122, 122, . . . , respectively. That is, the ink jet heads 196K, 196C, 196M, and 196Y are disposed at regular intervals along the transport path.

A plurality of nozzles, which are aqueous ink outlets, are two-dimensionally arranged on each nozzle surface of the ink jet heads 196K, 196C, 196M, and 196Y. The nozzle surface refers to a jetting surface on which the nozzles are formed.

Each of the ink jet heads 196K, 196C, 196M, and 196Y can be configured by connecting a plurality of head modules in a width direction of the film substrate 2.

Aqueous ink droplets are jetted from at least one of the ink jet head 196K, the ink jet head 196C, the ink jet head 196M, or the ink jet head 196Y toward the printing surface of the film substrate 2 transported by the transport section 120, and the jetted droplets adhere to the film substrate 2, whereby an image is printed on the printing surface of the film substrate 2.

Although the configuration in which aqueous inks of four colors are used has been described here, the ink colors and the number of colors are not limited to those in the present embodiment. For example, an ink jet head may be added that jets pale color inks such as light magenta and light cyan, special color inks such as green, orange and violet, clear inks, and metallic inks. In addition, the order in which the ink jet heads of the respective colors are disposed is not limited.

The film substrate 2 on which the color image has been printed by the color printing portion 188 is transported to a position facing the white printing portion 190.

The white printing portion 190 is disposed downstream of the color printing portion 188 in the transport path. The white printing portion 190 applies an aqueous white ink to the printing surface of the film substrate 2 to print a white background image. The aqueous white ink uses titanium oxide as a pigment, which has a relatively larger specific gravity than the organic pigments in the color inks, making the ink liquid as a whole relatively heavier. The white printing portion 190 comprises ink jet heads 196W1 and 196W2.

The configurations of the ink jet heads 196W1 and 196W2 are the same as those of the ink jet heads 196K, 196C, 196M, and 196Y. White aqueous ink is supplied to each of the ink jet heads 196W1 and 196W2 from an ink tank (not shown) via a pipe path (not shown). The ink jet heads 196W1 and 196W2 are disposed such that nozzle surfaces (not shown) face the pass rollers 122, 122, respectively. That is, the ink jet heads 196W1 and 196W2 are disposed at regular intervals along the transport path.

Aqueous white ink droplets are jetted from at least one of the ink jet head 196W1 or the ink jet head 196W2 toward the printing surface of the film substrate 2 transported by the transport section 120, and the jetted droplets adhere to the film substrate 2, whereby a white background image is printed on the printing surface of the film substrate 2.

Although the configuration in which the two ink jet heads 196W1 and 196W2 are used has been described here, only one ink jet head may be used or three or more ink jet heads may be used.

The aqueous color ink and the aqueous white ink applied to the printing surface of the film substrate 2 in the jetting section 180 are condensed and thickened by the aqueous primer applied to the printing surface of the film substrate 2 in the pre-coating section 150.

The film substrate 2 on which the white background image has been printed by the white printing portion 190 is guided by the pass roller 122 to be transported to a position facing the examination portion 197.

The examination portion 197 examines a test pattern image such as a nozzle check pattern printed on the film substrate 2 in the ink jet heads 196K, 196C, 196M, 196Y, 196W1, and 196W2. The examination portion 197 comprises a first scanner 198 and a second scanner 199. The first scanner 198 and the second scanner 199 each include an imaging device that images a test pattern image printed on the printing surface of the film substrate 2 and converts the image into an electric signal. A color charge coupled device (CCD) linear image sensor can be used as the imaging device. A color complementary metal oxide semiconductor (CMOS) linear image sensor can be used instead of the color CCD linear image sensor.

The first scanner 198 and the second scanner 199 are each disposed on the printing surface side of the film substrate 2, and read the test pattern image printed on the printing surface of the film substrate 2, from the printing surface side. The test pattern image read by the first scanner 198 and the second scanner 199 is determined by a determination unit (not shown) to specify a defective nozzle or the like.

The film substrate 2 of which the test pattern image has been examined by the examination portion 197 is guided downward by the second suction drum 186 to be transported to the second noncontact turn portion 192.

The second noncontact turn portion 192 is disposed between the second suction drum 186 and the main drying section 200 in the transport path, and particularly, is disposed immediately after the white printing portion 190 in the transport path. The second noncontact turn portion 192 changes the direction of the transport path from a downward direction to an upward direction without contacting the printing surface of the film substrate 2. The configuration of the second noncontact turn portion 192 is the same as the configuration of the first noncontact turn portion 160, and the air roll 18 can be applied thereto.

The second noncontact turn portion 192 causes the film substrate 2 to float by a predetermined floating height and changes the traveling direction by 180 degrees. With the second noncontact turn portion 192, there is no influence on an image printed on the printing surface because the second noncontact turn portion 192 does not contact the printing surface.

The second noncontact turn portion 192 may comprise an air volume control device that regulates an amount of air to be blown and a temperature control device that regulates a temperature of the air to be blown. The temperature of the air contributes to the elongation of the film substrate 2. In addition, the volume of air contributes to the floating height of the film substrate 2.

The film substrate 2 of which the traveling direction has been changed by the second noncontact turn portion 192 is guided by the pass rollers 122, 122, . . . to be transported to the fourth tension pickup roller 126.

The film substrate 2 of which the transport tension has been detected by the fourth tension pickup roller 126 is transported from the jetting section 180 to the main drying section 200. In this way, the ink jet printing apparatus 100 turns the film substrate 2 between printing and drying in a noncontact manner.

[Main Drying Section]

The main drying section 200 is disposed downstream of the jetting section 180 in the transport path. The main drying section 200 dries the aqueous ink applied to the printing surface of the film substrate 2. As the main drying section 200, the drying device 10 can be applied, and detailed description thereof will be omitted.

The film substrate 2 of which the aqueous ink applied to the printing surface has been dried is transported from the main drying section 200 to the winding section 220.

[Winding Section]

The winding section 220 comprises the winding roll 222, an inspection portion 224, the fourth drive roller 230, a fifth drive roller 232, and a pressing roller 236. The pass rollers 122, 122, . . . are disposed on the transport path of the winding section 220. The film substrate 2 transported from the main drying section 200 is guided by the pass roller 122 to be transported to the fifth tension pickup roller 127. The film substrate 2 of which the transport tension has been detected by the fifth tension pickup roller 127 is guided by the pass rollers 122 to be transported to a position facing the inspection portion 224.

The inspection portion 224 examines an image printed on the printing surface of the film substrate 2. The inspection portion 224 comprises a third scanner 226 and a fourth scanner 228. The configurations of the third scanner 226 and the fourth scanner 228 are the same as those of the first scanner 198 and the second scanner 199.

The third scanner 226 and the fourth scanner 228 are each disposed on the side opposite to the printing surface of the film substrate 2, and read the image printed on the printing surface of the film substrate 2, from the opposite surface of the printing surface. Whether or not the image read by the third scanner 226 and the fourth scanner 228 is favorable is determined by a determination unit (not shown).

The film substrate 2 of which an image has been examined by the inspection portion 224 is guided by the pass rollers 122 to be transported to the fourth drive roller 230. The fourth drive roller 230 is rotated by a motor (not shown), and comes into contact with the film substrate 2 to transport the film substrate 2. The film substrate 2 transported by the fourth drive roller 230 is transported to the fifth drive roller 232. The fifth drive roller 232 is rotated by a motor (not shown), and comes into contact with the film substrate 2 to transport the film substrate 2.

The film substrate 2 transported by the fifth drive roller 232 is guided by the pass rollers 122, 122, . . . to be transported to the sixth tension pickup roller 128. The film substrate 2 of which the transport tension has been detected by the sixth tension pickup roller 128 is guided by the pass rollers 122 and is wound onto the winding roll 222.

The pressing roller 236 is disposed at a position facing the winding roll 222. The pressing roller 236 is provided at a distal end of a swing arm 238. The swing arm 238 presses the pressing roller 236 against the film substrate 2 wound on the winding roll 222 with a pressing unit (not shown).

In the ink jet printing apparatus 100 configured as described above, the film substrate 2 is transported to the unwinding section 130, the pre-coating section 150, the jetting section 180, the main drying section 200, and the winding section 220 in this order, and treatment is performed on the film substrate 2 in each of the unwinding section 130, the pre-coating section 150, the jetting section 180, the main drying section 200, and the winding section 220 so that a printed matter is produced.

<Others>

The technical scope of the present invention is not limited to the scope described in the above embodiments. The configurations and the like in each embodiment can be appropriately combined among the respective embodiments without departing from the spirit of the present invention.

EXPLANATION OF REFERENCES

1: substrate
1A: liquid application surface
1B: opposite surface
2: film substrate
10: drying device
12: pass roller
$12_{IN}$: pass roller
$12_{OUT}$: pass roller
14: hot air heater
16: folding-back roller
18: air roll
20: body part
20A: first outer peripheral surface
20B: first inner peripheral surface
22: closing member
24A: first non-jetting region
24B: first jetting region
26: flange
28: air supply port
30: air roll
32: aluminum core metal
32A: second outer peripheral surface
32B: second inner peripheral surface
34A: second non-jetting region
34B: second jetting region
36: second hole
40: body part
42: air supply port
50: air roll
52: flange
54: axial fan
60: static elimination brush
62: ionizer
64: charging device
100: ink jet printing apparatus
120: transport section
122: pass roller
123: first tension pickup roller
124: second tension pickup roller
125: third tension pickup roller
126: fourth tension pickup roller
127: fifth tension pickup roller
128: sixth tension pickup roller
130: unwinding section
132: unwinding roll
134: first drive roller
136: second drive roller 138: corona treatment unit
150: pre-coating section
152: coater
154: coating roller
155: chamber
156: opposing roller
158: PC drying unit
160: first noncontact turn portion
180: jetting section
184: first suction drum
186: second suction drum
188: color printing portion
190: white printing portion
192: second noncontact turn portion
196C: ink jet head
196K: ink jet head
196M: ink jet head
196W1: ink jet head
196W2: ink jet head
196Y: ink jet head
197: examination portion
198: first scanner
199: second scanner
200: main drying section
220: winding section
222: winding roll
224: inspection portion
226: third scanner
228: fourth scanner
230: fourth drive roller
232: fifth drive roller
236: pressing roller
238: swing arm

What is claimed is:

1. An air bar that guides a web-shaped workpiece on a guide surface of an outer surface in a noncontact manner, the air bar comprising:

a body part that has a tubular shape having a first outer peripheral surface and a first inner peripheral surface and consists of a porous body having a plurality of first holes penetrating the first outer peripheral surface and the first inner peripheral surface;

an air supply mechanism part for supplying air to an inside of the body part; and cover parts that are provided at both side ends of the body part to prevent outflow of the air from the both side ends, wherein the first outer peripheral surface of the body part includes a first non-jetting region in which the first holes are closed and a first jetting region other than the first non-jetting region, the first jetting region is disposed at a position corresponding to the guide surface of the air bar, and the first non-jetting region is disposed at a position corresponding to the outer surface of the air bar other than the guide surface, wherein the air supply mechanism part is provided in the first non-jetting region of the body part.

2. The air bar according to claim 1, wherein the first jetting region of the body part constitutes the guide surface of the air bar, and the first non-jetting region of the body part constitutes the outer surface of the air bar other than the guide surface.

3. The air bar according to claim 1, further comprising:

a perforated container that has a tubular shape having a second outer peripheral surface and a second inner peripheral surface and has a plurality of second holes penetrating the second outer peripheral surface and the second inner peripheral surface, wherein the perforated container is disposed inside the body part, and the air supply mechanism part supplies air to an inside of the perforated container.

4. The air bar according to claim 3, wherein the perforated container includes a second jetting region in which the second holes are provided and a second non-jetting region other than the second jetting region, the second jetting region is disposed at a position corresponding to the guide surface of the air bar, and the second non-jetting region is disposed at a position corresponding to the outer surface of the air bar other than the guide surface.

5. The air bar according to claim 1, wherein the first non-jetting region is formed by surface coating.

6. The air bar according to claim 1, wherein the first jetting region and the first non-jetting region are formed in different colors.

7. The air bar according to claim 1, wherein a static elimination brush configured such that a brush portion of the static elimination brush abuts on the first non-jetting region of the air bar or an ionizer that generates and supplies ions to the first jetting region of the air bar is provided.

8. The air bar according to claim 1, wherein a charging device that is disposed to face a surface of the web-shaped workpiece and charges the web-shaped workpiece to have the same polarity as a polarity with which the air bar is charged by the air is provided.

9. The air bar according to claim 1, wherein the porous body is made of a resin.

10. The air bar according to claim 9, wherein the porous body contains any one of polyethylene (PE), polypropylene (PP), or polytetrafluoroethylene (PTFE).

11. A drying device comprising:

an air bar according to claim 1, that guides the web-shaped workpiece to which a liquid is applied in a noncontact manner; and a heating device that heats the web-shaped workpiece.

12. An ink jet printing apparatus comprising:

an ink jet head that applies an ink to a web-shaped workpiece to record an image; and an drying device according to claim 11.

* * * * *